(12) United States Patent
Altman et al.

(10) Patent No.: US 10,953,555 B2
(45) Date of Patent: Mar. 23, 2021

(54) FIELD REPLACEABLE BATTERY PACK AND LIFT COUNTERBALANCE FOR A MOBILE MANIPULATION ROBOT

(71) Applicants: Vladimir Altman, Pittsburgh, PA (US); Thomas Galluzzo, Gibsonia, PA (US)

(72) Inventors: Vladimir Altman, Pittsburgh, PA (US); Thomas Galluzzo, Gibsonia, PA (US)

(73) Assignee: IAM Robotics, LLC, Pittsburgh, PA (US)

( * ) Notice: Subject to any disclaimer, the term of this patent is extended or adjusted under 35 U.S.C. 154(b) by 608 days.

(21) Appl. No.: 15/785,207

(22) Filed: Oct. 16, 2017

(65) Prior Publication Data
US 2018/0104829 A1    Apr. 19, 2018

Related U.S. Application Data

(60) Provisional application No. 62/408,187, filed on Oct. 14, 2016.

(51) Int. Cl.
| | |
|---|---|
| *B25J 19/00* | (2006.01) |
| *B25J 9/16* | (2006.01) |
| *H01M 10/46* | (2006.01) |
| *H02J 7/00* | (2006.01) |
| *B25J 5/00* | (2006.01) |
| *B60L 50/64* | (2019.01) |
| *B60L 53/80* | (2019.01) |
| *H01M 10/48* | (2006.01) |
| *H01M 50/20* | (2021.01) |
| *H02J 9/06* | (2006.01) |
| *H02J 7/02* | (2016.01) |
| *B60L 53/31* | (2019.01) |

(52) U.S. Cl.
CPC ............. *B25J 19/005* (2013.01); *B25J 5/007* (2013.01); *B25J 9/16* (2013.01); *B25J 9/162* (2013.01); *B60L 50/64* (2019.02); *B60L 53/80* (2019.02); *H01M 10/46* (2013.01); *H01M 10/48* (2013.01); *H01M 50/20* (2021.01); *H02J 7/0045* (2013.01); *B60L 53/31* (2019.02); *G05B 2219/40298* (2013.01); *H01M 2220/20* (2013.01); *H02J 7/0047* (2013.01); *H02J 7/025* (2013.01); *H02J 9/061* (2013.01); *Y10S 901/01* (2013.01); *Y10S 901/09* (2013.01)

(58) Field of Classification Search
CPC .......... B25J 19/005; B60L 50/64; B60L 53/80
See application file for complete search history.

(56) References Cited

U.S. PATENT DOCUMENTS

| | | | |
|---|---|---|---|
| 6,357,070 B1 * | 3/2002 | Venard | H01M 50/20 15/50.1 |
| 7,031,805 B2 | 4/2006 | Lee et al. | |
| 9,550,294 B2 | 1/2017 | Cohen et al. | |

(Continued)

*Primary Examiner* — Jess Whittington
(74) *Attorney, Agent, or Firm* — Dentons Cohen & Grigsby P.C.

(57) ABSTRACT

Systems and methods for improved power supply and use in a battery powered device, such as a mobile manipulation robot, are disclosed. These systems include field replaceable batteries that may be hot-swapped with no robot downtime, methods for automating battery replacement messaging and robot operation when battery power is low, and improved mechanical systems having lower energy requirements, and thus extending the lifetime of the battery operated mobile manipulation robot.

20 Claims, 13 Drawing Sheets

(56) References Cited

U.S. PATENT DOCUMENTS

| | | |
|---|---|---|
| 9,776,326 B2 | 10/2017 | Zevenbergen et al. |
| 10,018,226 B2 * | 7/2018 | Ishihara .............. F16C 29/0602 |
| 2006/0244413 A1 * | 11/2006 | Zedell ................... H02J 7/0045 |
| | | 320/107 |
| 2009/0101422 A1 * | 4/2009 | Subramanian ....... B62D 25/082 |
| | | 180/65.31 |
| 2010/0010672 A1 | 1/2010 | Wang et al. |
| 2010/0181129 A1 | 7/2010 | Hamidi |
| 2011/0005846 A1 * | 1/2011 | Page ....................... B25J 5/005 |
| | | 180/8.7 |
| 2013/0256046 A1 * | 10/2013 | Kyoden .................. B62M 7/12 |
| | | 180/68.5 |
| 2015/0280467 A1 * | 10/2015 | Matsuda ................. B60L 53/16 |
| | | 307/10.1 |
| 2016/0135325 A1 * | 5/2016 | Chen .................... A47B 96/067 |
| | | 312/334.1 |
| 2017/0368684 A1 * | 12/2017 | Zevenbergen .......... B60L 53/80 |
| 2019/0106829 A1 * | 4/2019 | Bueno .................... D06F 34/28 |

* cited by examiner

FIELD REPLACEABLE BATTERY PACK AND LIFT COUNTERBALANCE FOR A MOBILE MANIPULATION ROBOT

RELATED APPLICATIONS

This application claims the benefit under 35 U.S.C. § 119(e) of prior U.S. Provisional Patent Application Ser. No. 62/408,187, filed on Oct. 14, 2016, the entire content of which is hereby incorporated by reference.

TECHNICAL FIELD

The present invention relates generally to systems and methods for battery exchange and power conservation in a robotic device.

BACKGROUND

The recent development of robotic devices, and in particular autonomous robotic devices which use battery power, has been significant. These devices find use in a large number of environments, and are configured to perform a wide range of functions. For example, small battery powered cleaning robots, such as detailed in U.S. Pat. Nos. 7,031,805 and 9,550,294, are configured to vacuum floors in residential and small commercial settings. These robots include batteries which may be recharged when the robot docks with a charging station. In general, these small robots are able to complete their assigned tasks on a single battery charge, and thus the down-time associated with recharging does not pose a problem (i.e., the battery is recharged before the floors need to be cleaned again).

Larger systems, such a humanoid robots, robots configured to restock inventory, and robotic vehicles which perform in hazardous environments, are generally larger, and therefore have greater power requirements. As such, they may not be able to complete an assigned task on a single battery charge. Moreover, their assigned tasks may be open-ended such that any down-time would represent an impediment. For example, in logistics facilities, such as distribution centers or retail stores, goods are constantly being put-away (stocked or shelved) and picked (retrieved from the shelves). Since these robots are generally expensive, most facilities limit their total number. As such, the downtime required to charge a robot working in such a facility would represent a significant delay in the flow of goods within the facility.

Previous solutions to such a problem include the exchange of discharged batteries for fully charged batteries. For example, U.S. Patent Application Publication No. 2011/0005846 describes manual replacement of discharged batteries in a robotic vehicle. Since the batteries typically weight in excess of 50 pounds, the manual effort to replace a battery is not insignificant.

More fully automated systems are disclosed in U.S. Patent Application Publication No. 2010/0181129, which describes a system for swapping battery packs of an electric vehicle which includes an automated conveyance system that pushes a replaceable battery into a battery compartment on the vehicle. U.S. Pat. No. 9,776,326 describes a method for exchanging batteries at a battery exchange station which uses a stationary robot to remove and replace exhausted batteries in a mobile robot. Both systems are intended to relieve human workers from the burden of handling, e.g., lifting into place, the heavy batteries. Both systems, however, impose additional expense to purchase and maintain the battery exchange robot.

Because of these limitations, it would be desirable to provide systems and methods to reduce the power needs of such mobile robots, and thus provide mobile robots having smaller batteries and/or extended service times on a single battery charge, and methods and systems that may reduce or eliminate the time required to recharge a mobile robot, such as by providing improved systems and methods for battery exchange.

SUMMARY

The presently disclosed invention overcomes many of the shortcomings of the prior art by providing systems, devices and methods which reduce the power needs of a mobile robot. Moreover, the presently disclosed invention provides systems, devices and methods which reduce or eliminate the downtime required to recharge a mobile robot.

Accordingly, the present invention provides a field replaceable battery comprising at least one battery cell, a main body configured to contain therein the at least one battery cell, means to enable movement of the field replaceable battery, a charging interface for connecting the at least one battery cell to an external power source, a blind mate connector electrically connected to the at least one battery cell and configured to engage a corresponding blind mate connector on a battery powered device, and a battery connection means angled with respect to the longitudinal axis of the main body, wherein the angle is upward from a front end to a back end of the main body so that the field replaceable battery is lifted into an engaged position on connection with the battery powered device.

According to certain aspects of the field replaceable battery, the battery connection means may be attached to left and right sides of the main body. The engaged position provides electrical connection between the blind mate connector on the field replaceable battery and the corresponding blind mate connector on the battery powered device.

According to certain aspects of the field replaceable battery, the means to enable movement of the battery may be attached to a bottom of the main body, such as a bottom surface, and may include fixed and/or rotatable caters.

According to certain aspects of the field replaceable battery, the battery connection means may be configured to engage complementary device connection means in a cavity of the battery powered device. The device connection means may be positioned on an inner right side and an inner left side of the cavity. One of the device connection means or the battery connection means may be a rail, and the other of the device connection means or the battery connection means may be a set of wheels configured to engage the rail.

According to certain aspects, the field replaceable battery may further include a locking handle having a locked position and an unlocked position, wherein the locked position is configured to lock the field replaceable battery in the engaged position on the battery powered device, and the unlocked position is configured to allowed movement of the field replaceable battery within the cavity of the battery powered device.

According to certain aspects, the field replaceable battery may further include a charge sensor configured to sense a charge state of the at least one battery cell, and a circuit electrically connected to the charge sensor for receiving a signal indicative of the charge state of the at least one battery cell.

According to certain aspects of the field replaceable battery, the main body may include a cover configured to provide access to an internal compartment of the main body comprising the at least one battery cell, the charge sensor, and the circuit.

According to certain aspects of the field replaceable battery, the external power source may include a wired charging station, a wireless charging station, a direct connection to an AC power source, or a combination thereof. Accordingly, the charging interface may be configured to provide electrical connection with any of these external power sources.

The present invention further provides a power system for a mobile robot which includes the field replaceable battery according to any of the above mentioned aspects, or combination of aspects, and a backup battery configured to provide power to the mobile robot when the field replaceable battery is removed or fully discharged.

According to certain aspects of the power system, the mobile robot may include a mobile base comprising a cavity configured to accept the field replaceable battery, at least one manipulator arm, a plurality of sensors, a memory, and one or more robot processors coupled to the plurality of sensors, the memory, the mobile base, and the at least one manipulator arm. The memory may comprise computer program instructions executable by the one or more robot processors to process data received from each of the plurality of sensors, and output control signals to the mobile base and the at least one manipulator arm.

According to certain aspects of the power system, the cavity of the mobile base may include a device connection means configured to engage the battery connection means. According to certain aspects of the power system, the cavity of the mobile base may include a device connection means positioned on an inner right side of the cavity and configured to engage the battery connection means on the right side of the main body of the field replaceable battery, and a device connection means positioned on an inner left side of the cavity and configured to engage the battery connection means on the left side of the main body of the field replaceable battery.

According to certain aspects of the power system, the mobile robot may further include a remote communication interface, and the memory may comprise computer program instructions executable by the one or more robot processors to receive data from and send data to a central server.

According to certain aspects of the power system, the field replaceable battery may further comprise a charge sensor configured to sense a charge state of the at least one battery cell, and a circuit electrically connected to the charge sensor for receiving a signal indicative of the charge state of the at least one battery cell. The memory of the mobile robot may comprise computer program instructions executable by the one or more robot processors to receive signal data indicating the charge state of the at least one battery cell and alter the navigation and/or work function based on the charge state of the at least one battery cell. The memory of the mobile robot may comprise computer program instructions executable by the one or more robot processors to send data indicating the charge state of the at least one battery cell to the central server and receive navigation instructions from the central server.

The present invention further includes a lift counterbalance system which includes a coil spring assembly comprising a tensioning spring within an outer cylindrical cover, an inner polymeric cylinder positioned either between the tensioning spring and outer cylindrical cover or on the inside of the tensioning spring, a cable accumulation cone operatively attached to an end of the tensioning spring, a cable having a first end attached to the cable accumulation cone and a second end attached to a lift mechanism, and a pulley configured to guide the cable between the cable accumulation cone and the lift mechanism. Movement of the lift mechanism downward may pull the cable from the cable accumulation cone through the pulley and rotate the coil spring to increase tension on the cable. Additionally, the inner polymeric cylinder may dampen noise produced during rotation of the coil spring.

According to certain aspects of the lift counterbalance system, the system may further include a locking mechanism configured to retain the tension of the coil spring upon rotation thereof and in the event the cable breaks or is disconnected. Additionally, the system may further include a quick release mechanism to disconnect the lift mechanism from the cable.

According to certain aspects of the lift counterbalance system, the cable accumulation cone may be attached to an end of the tensioning spring, or an end of the outer cylindrical cover. The tensioning spring may be attached to an end of the cable accumulation cone or to an end of the outer cylindrical cover.

The present invention further provides a mobile robot comprising a mobile base, at least one manipulator arm, a plurality of sensors, a memory, and one or more robot processors coupled to the plurality of sensors, the memory, the mobile base, and the at least one manipulator arm, wherein the memory comprises computer program instructions executable by the one or more robot processors to process data received from each of the plurality of sensors, and output control signals to the mobile base and the at least one manipulator arm.

According to certain aspects, the mobile robot may further include the field replaceable battery according to any of the above mentioned aspects, or combination of aspects, and optionally a backup battery configured to provide power to a mobile robot when the field replaceable battery is removed or fully discharged. The field replaceable battery may include a battery connection means attached to each of a left side and a right side of the main body, each of the battery connection means angled with respect to the longitudinal plane of the main body, wherein the angle is upward from a front end to a back end of the main body so that the field replaceable battery is lifted/elevated into an engaged position on connection with the mobile base of the mobile robot, wherein the engaged position provides electrical connection between the blind mate connector on the field replaceable battery and a corresponding blind mate connector on the mobile base.

According to certain aspects, the mobile base of the mobile robot, may include a cavity configured to accept the field replaceable battery, and may include a device connection means positioned on an inner right side of the cavity and configured to engage the battery connection means on the right side of the main body of the field replaceable battery; and a device connection means positioned on an inner left side of the cavity and configured to engage the battery connection means on the left side of the main body of the field replaceable battery. The device connection means are angled upward from a front to a back of the cavity so that engagement with the battery connection means on each of the left and the right side of the main body of the field replaceable battery lift the field replaceable battery when pushed into the cavity and into the engaged position.

According to certain aspects, the at least one manipulator arm of the mobile robot may include a first end portion pivotally carried by the mobile base, a second end portion comprising an end effector, and an extension tool positioned at or near the second end portion and configured to provide access to an object without interference from surrounding objects or infrastructure within a logistics facility.

According to certain aspects, the mobile robot may include a vertical actuator stage configured to raise and lower relative to the mobile base, the at least one manipulator arm having a first end portion mounted on the vertical actuator stage and a second end portion comprising an end effector.

According to certain aspects, the memory of the mobile robot may include computer program instructions executable by one or more robot processors to receive a signal or data from the circuit indicative of the charge state of the at least one battery cell and alter a navigation path or work task of the mobile robot based on the charge state, and/or may send the signal or data to the central server and receive an altered navigation path or work task.

According to certain aspects, the mobile robot may include the lift counterbalance system according to any of the above mentioned aspects, or combination of aspects. For example, the mobile robot may include a right lift counterbalance system and a left lift counterbalance system, wherein movement of the lift mechanism downward pulls the cable from the cable accumulation cone through the pulley and rotates the coil spring to increase tension on the cable.

BRIEF DESCRIPTION OF DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale. The illustrative embodiments in the following drawings are not meant to be limiting; other embodiments may be utilized and other changes may be made without departing from the spirit or scope of the subject matter presented herein.

DETAILED DESCRIPTION

Figures 1A, 1B:
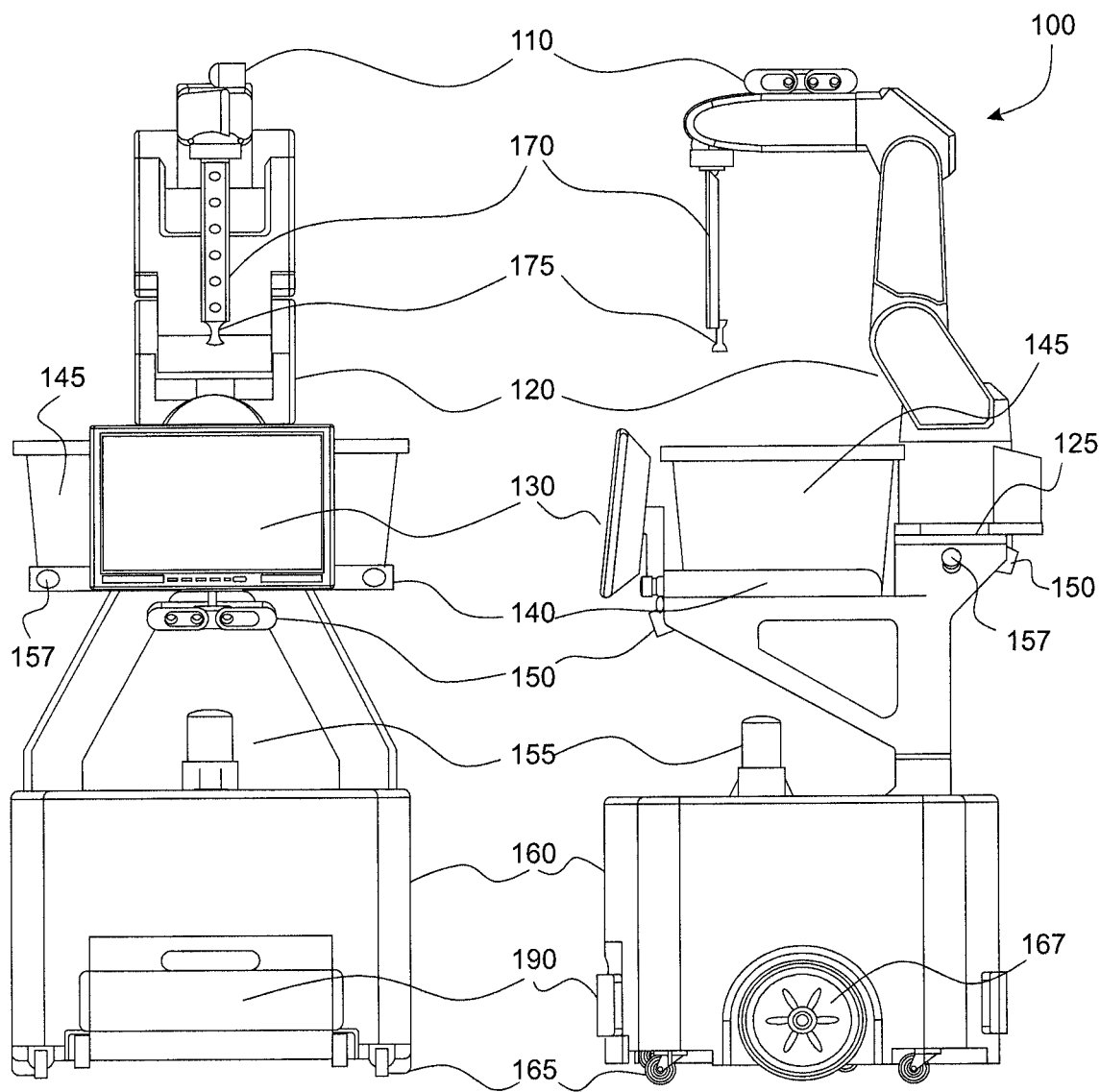
FIGS. 1A and 1B are front and side views, respectively, of a mobile manipulation robot in accordance with certain aspects of the presently disclosed invention.

In the following description, the present invention involves systems and methods for improved power supply and use in a battery powered device such as a mobile manipulation robot. These systems include field replaceable batteries that may be hot-swapped with no robot downtime, methods for automating battery replacement messaging and altering robot operation when battery power is low, and improved mechanical systems having lower energy requirements, and thus extending the lifetime of the battery operated mobile manipulation robot.

The above summary and drawings are not intended to describe or show each illustrated embodiment or every possible implementation of the presently disclosed invention. Various aspects of the systems and methods disclosed herein may be described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described component, event, or circumstance may or may not occur, and that the description includes instances where the event occurs and instances where it does not. In addition, the word "comprising" as used herein means "including, but not limited to".

Various aspects of the systems disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Relative terms such as "lower" or "bottom" and "upper" or "top" may be used herein to describe one element's relationship to another element illustrated in the drawings. It will be understood that relative terms are intended to encompass different orientations of aspects of the systems in addition to the orientation depicted in the drawings. By way of example, if aspects of the mobile manipulation robot shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

As defined herein, a Stock Keeping Unit (SKU) refers to a distinct item, and embodies attributes associated with the item that may distinguish it from another item. For a product, these attributes may include, but are not limited to, the product manufacturer, product description, material, size, shape, color, weight, and packaging. Further, an individual SKU may also have a code imprinted thereon which may indicate some of the same above attributes. Examples of such codes include at least barcodes such as a Universal Product Code (UPC), International Article Number (EAN), and Global Trade Item Number (GTIN).

The terms "goods" and "products" and "items" are used interchangeably, and may be taken to indicate items that need to be retrieved and/or stored. The terms "bin" and "tote" are also used interchangeably, and may be taken to mean a container used to store products or goods while they are located on a shelf within a logistics facility, or as they are moved throughout the logistics facility on a robotic system or conveyor belt.

Referring now to the drawings, systems and methods according to the presently disclosed invention are shown in FIGS. 1-9B. Like reference numbers are used to label similar or shared components in each of the figures (e.g., the mobile manipulator arm 120, 220, and 320, and the mobile base 160, 260, 360 from each of the mobile manipulation robots 100, 200, and 300, respectively). As such, reference to a component depicted in one figure, such as the mobile base 160 of FIG. 1A, may also include reference to the mobile base 260 in FIG. 2 and the mobile base 360 in FIGS. 3A and 3B.

Figure 2:
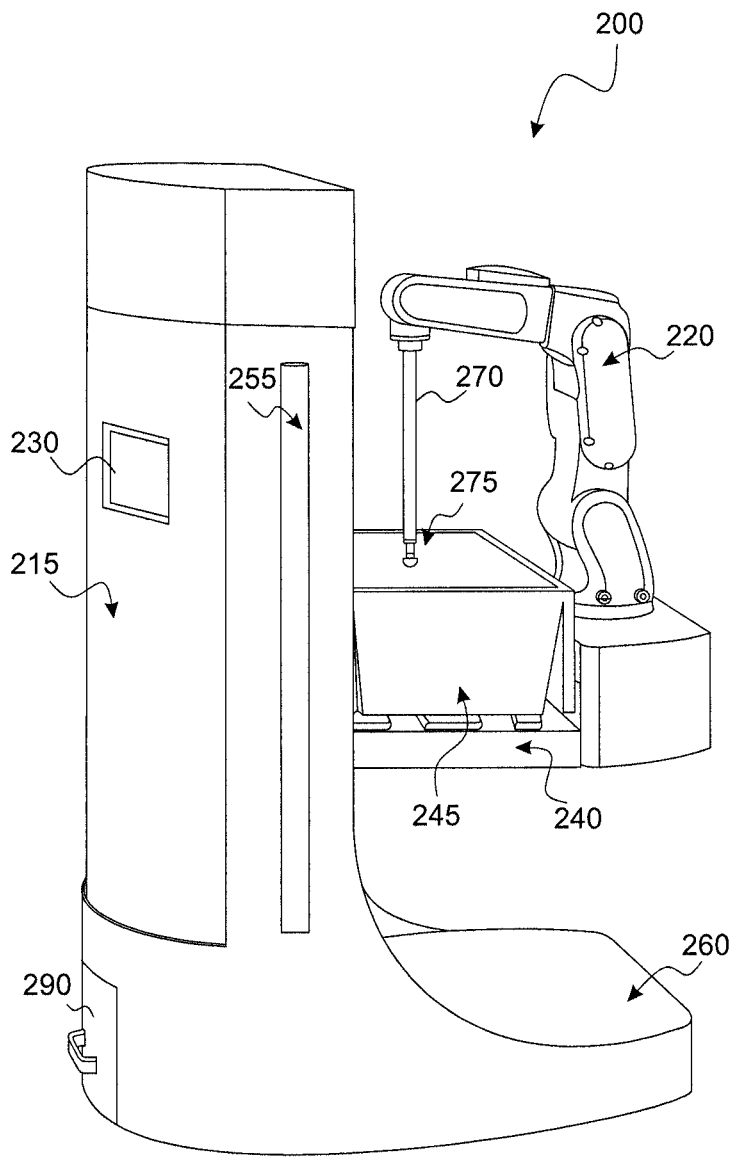
FIG. 2 is a side perspective view of a mobile manipulation robot in accordance with certain aspects of the presently disclosed invention.
Figure 3A:
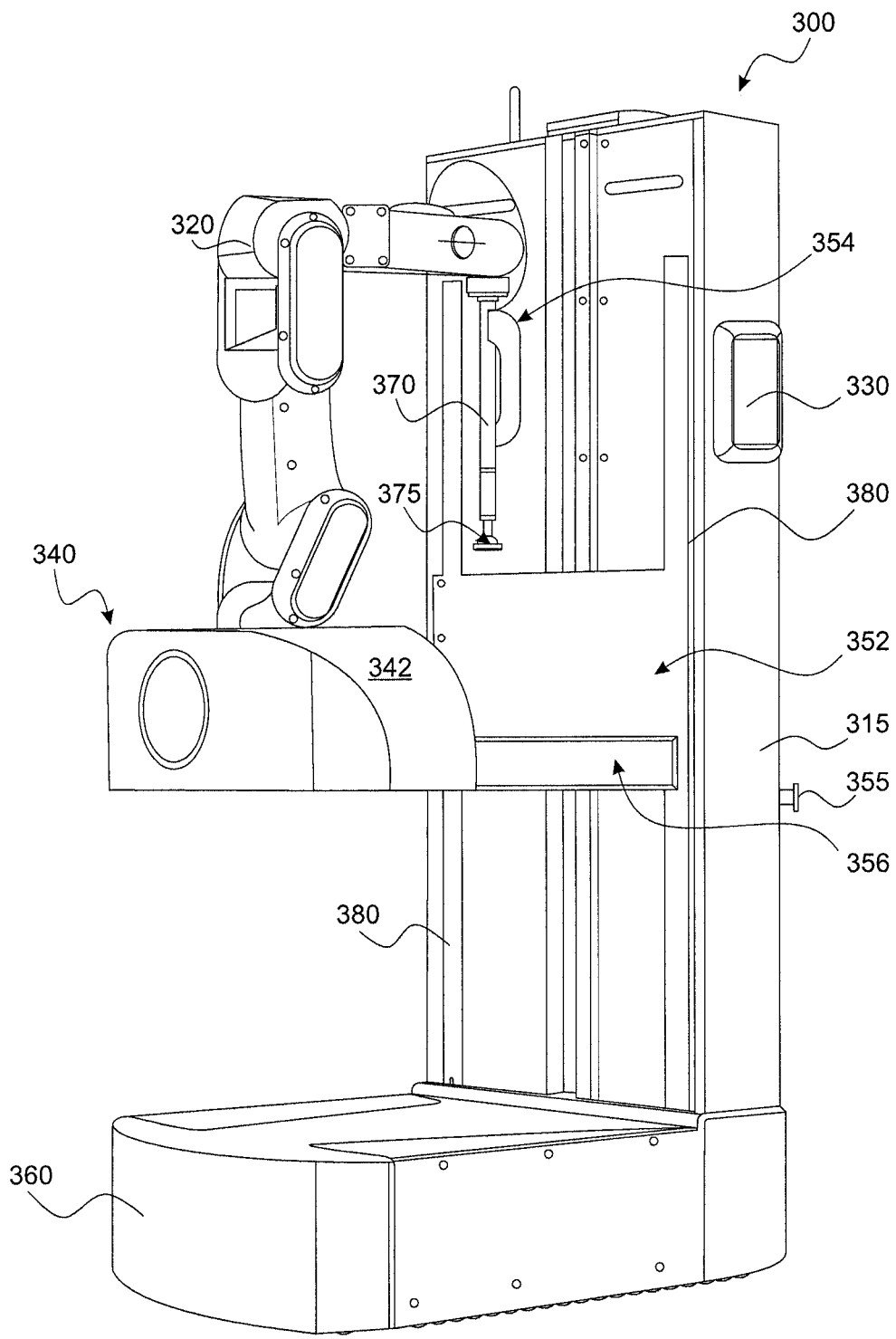
FIGS. 3A and 3B are front and back perspective views, respectively, of a mobile manipulation robot in accordance with certain aspects of the presently disclosed invention.
Figure 3B:
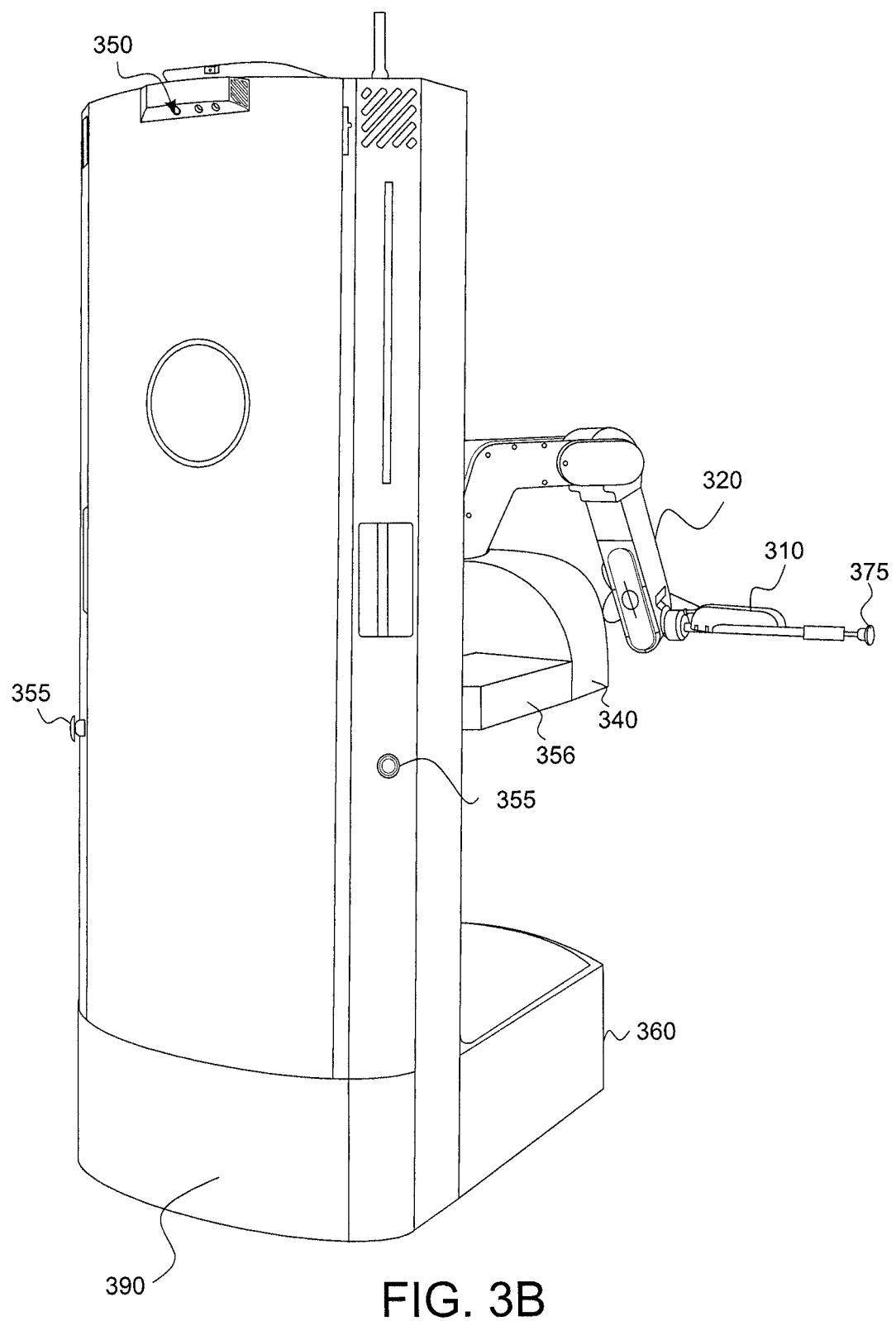
Figure 7:
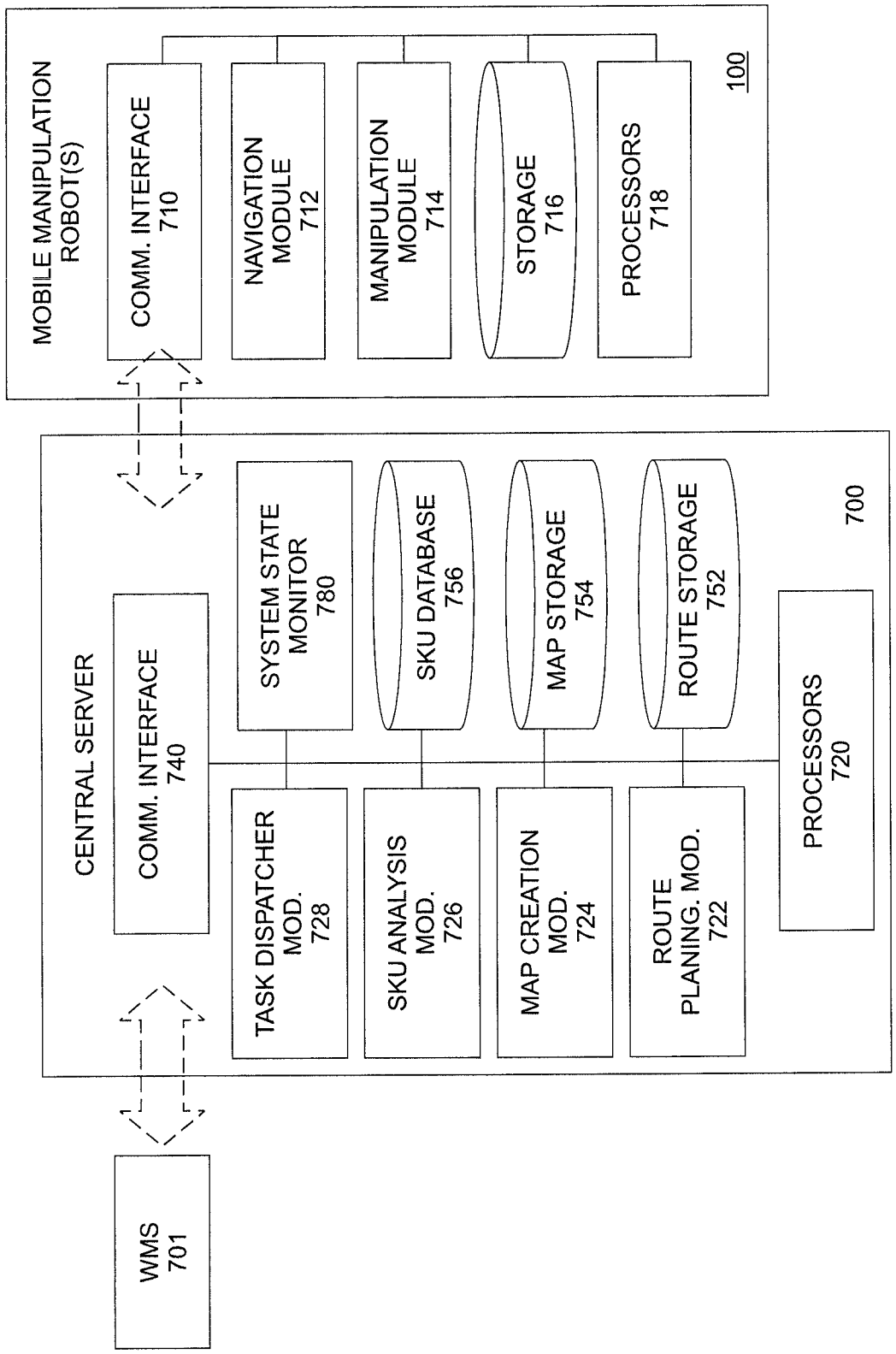
FIG. 7 is a block diagram of a robotic system with hardware and software modules of a central server and a plurality of mobile manipulation robots in accordance with certain aspects of the presently disclosed invention.

FIGS. 1A and 1B are front and side views of a mobile manipulation robot 100 which may include a mobile base 160, a manipulator arm 120, a plurality of sensors (110, 150), and computer processors and memory (see 718 and 716, respectively, of FIG. 7). The manipulator arm 120 may be mounted to the robot frame 125 at a position on top of the mobile base 160 of the mobile manipulation robot 100. Alternatively, as shown in FIG. 2, the manipulator arm 220 may be mounted on a vertical stage 240 which may be moveable vertically on the main body case 215 of the mobile manipulation robot 200. A similar position for the manipulator arm 320 is shown in FIGS. 3A and 3B, wherein the manipulator arm 320 is attached to a distal end 342 of a vertical actuator stage 340, which is moveable vertically (i.e., up and down) with respect to a main body case 315 of the mobile manipulation robot 300. The vertical actuator stage 340 moves in tracks 380 positioned in the main body case 315.

In the various embodiments of the mobile manipulation robots shown in FIGS. 1A, 1B, 2, and 3B (100, 200, 300, respectively), a field replaceable battery (190, 290, 390) may be inserted into a cavity within the mobile base (160, 260, 360). The computer processor and any associated components (memory storage, communication, connections) may be positioned in a portion of the mobile manipulation robot protected by an enclosure, such as the mobile base (160, 260, 360) and/or the main body case (215, 315) of the mobile manipulation robot.

Figure 4A:
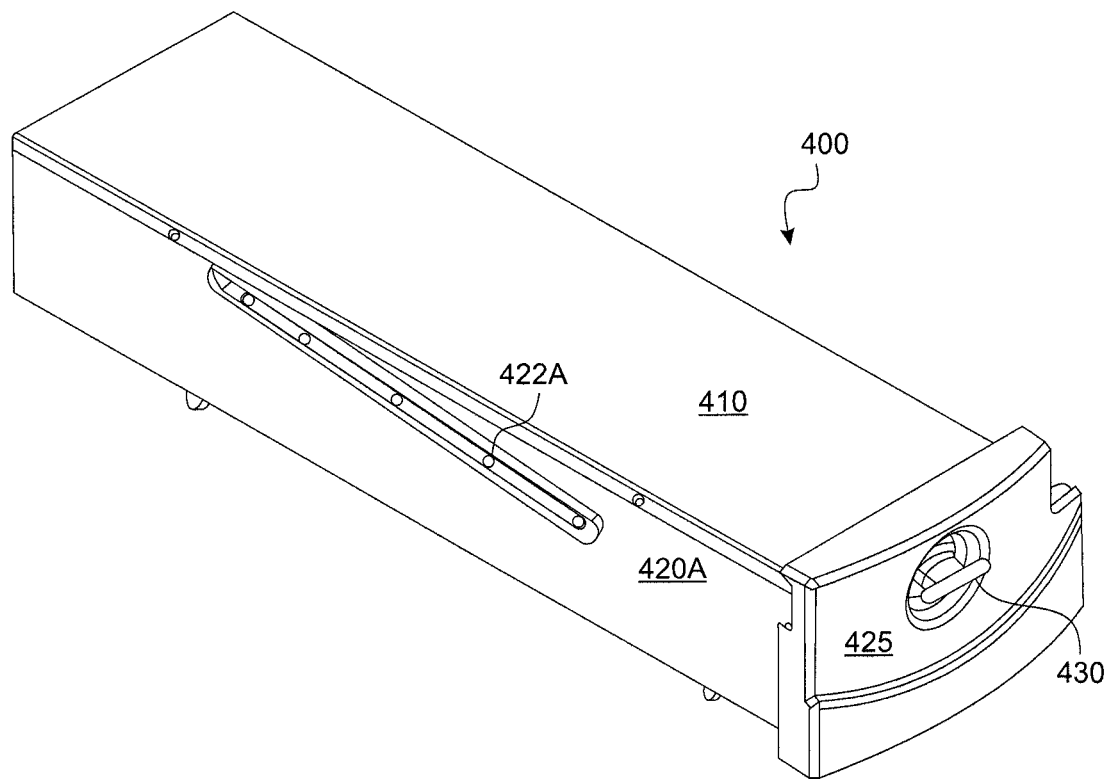
FIGS. 4A and 4B are left and right side perspective views, respectively, of a field replaceable battery in accordance with certain aspects of the present invention.
Figure 4B:
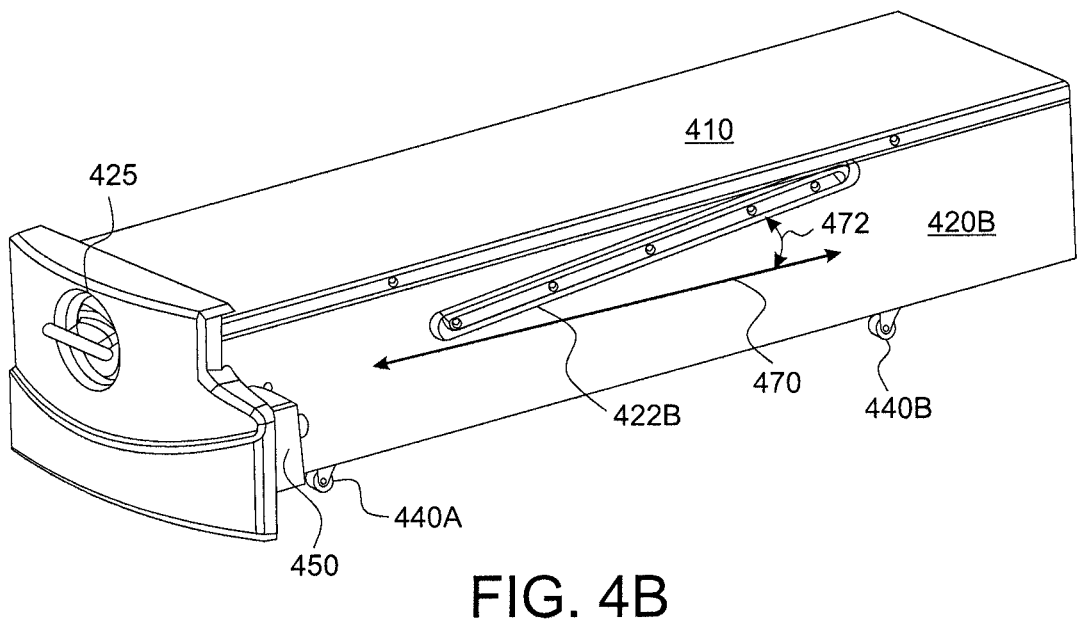
Figure 4C:
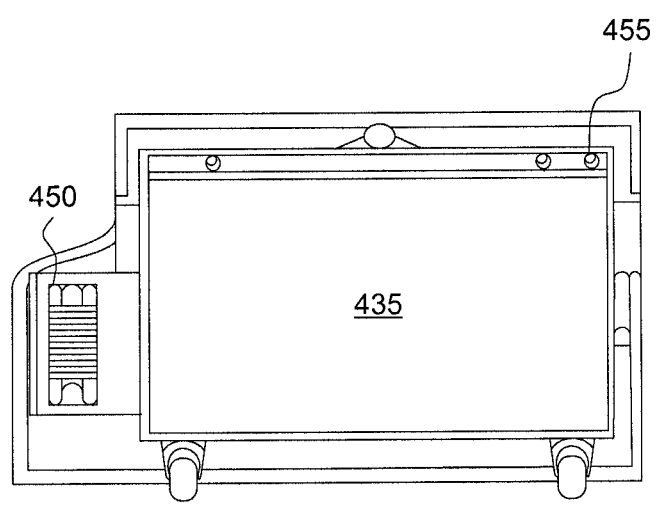
FIG. 4C is a back view of the field replaceable battery shown in FIGS. 4A and 4B.

As shown in FIGS. 4A-4C, the field replaceable battery 400 may include a main body having a top side 410, left and right side walls (420A and 420B, respectively), and front and back side walls (425 and 435, respectively).

The top side 410 may include a cover which may be opened to provide access to contents therein, such as at least one rechargeable battery cell. Exemplary rechargeable batteries include at least lithium ion batteries, such as rechargeable lithium iron phosphate batteries (e.g., 55V, 110 Amp).

Such batteries, which are configured to provide sufficient power to the mobile manipulation robots disclosed herein, may weight in excess of 50 pounds, such as at least 100 pounds. As such, they would generally be too heavy for the average person to lift and/or maneuver. Thus, also provided on the main body may be a means to enable movement of the field replaceable battery. For example, as shown in FIG. 4B, wheels (440A, 440B) such as fixed or rotatable casters may be attached to a bottom of the main body of the field replaceable battery 400. These may be included as sets of two or more wheels aligned to provide movement while maintaining stability of the field replaceable battery in an upright position (i.e., so that the battery does not tip). While wheels are shown in the figures, other means for movement of the field replaceable battery are possible and are within the scope of the presently disclosed invention. Moreover, while these wheels are shown to be attached to a bottom surface of the field replaceable battery, such may be attached along sides of the field replaceable battery and may extend below the bottom surface thereof to provide movement.

The main body may further include at least one connection means for engaging with complementary connection means on the battery powered device. For example, the main body may include at least one connection means on each of the left and right side of the main body. Shown in FIG. 4A is a connection rail 422A on the left side wall 420A of the main body. Shown in FIG. 4B is a connection rail 422B on the right side wall 420B of the main body. Each connection rail is attached to the side of the main body at an angle 472 that deviates from the longitudinal axis 470 of the main body. That is, the connection rails (420A, 420B) extend upward from a front side wall 425 to a back side wall 435 of the main body with respect to the longitudinal axis thereof.

The angle 472 may be at least 5°, such as at least 6°, or 7°, or 8°, or 9°, or 10°, or 15°, or 20°, or 25°, or 30°, or 35°, or 40°, or 45°. In general, the angle would not exceed 45° as the force required to push the field replaceable battery into the cavity on the battery powered device is directly related to the angle 472. That is, the connection rails provide a means to lift/elevate the field replaceable battery 400 into an engaged position on the battery powered device.

The specific position of these connection rails on the sides of the main body provide a means to connect the field replaceable battery 400 with a battery powered device by engaging with complementary device connection means in a cavity of the battery powered device. For example, the device connection means may be positioned on an inner right side and an inner left side of the cavity at a position complementary to the position of the battery connection rails (i.e., distance from the ground surface, angle, horizontal spacing, etc.).

Figure 5A:
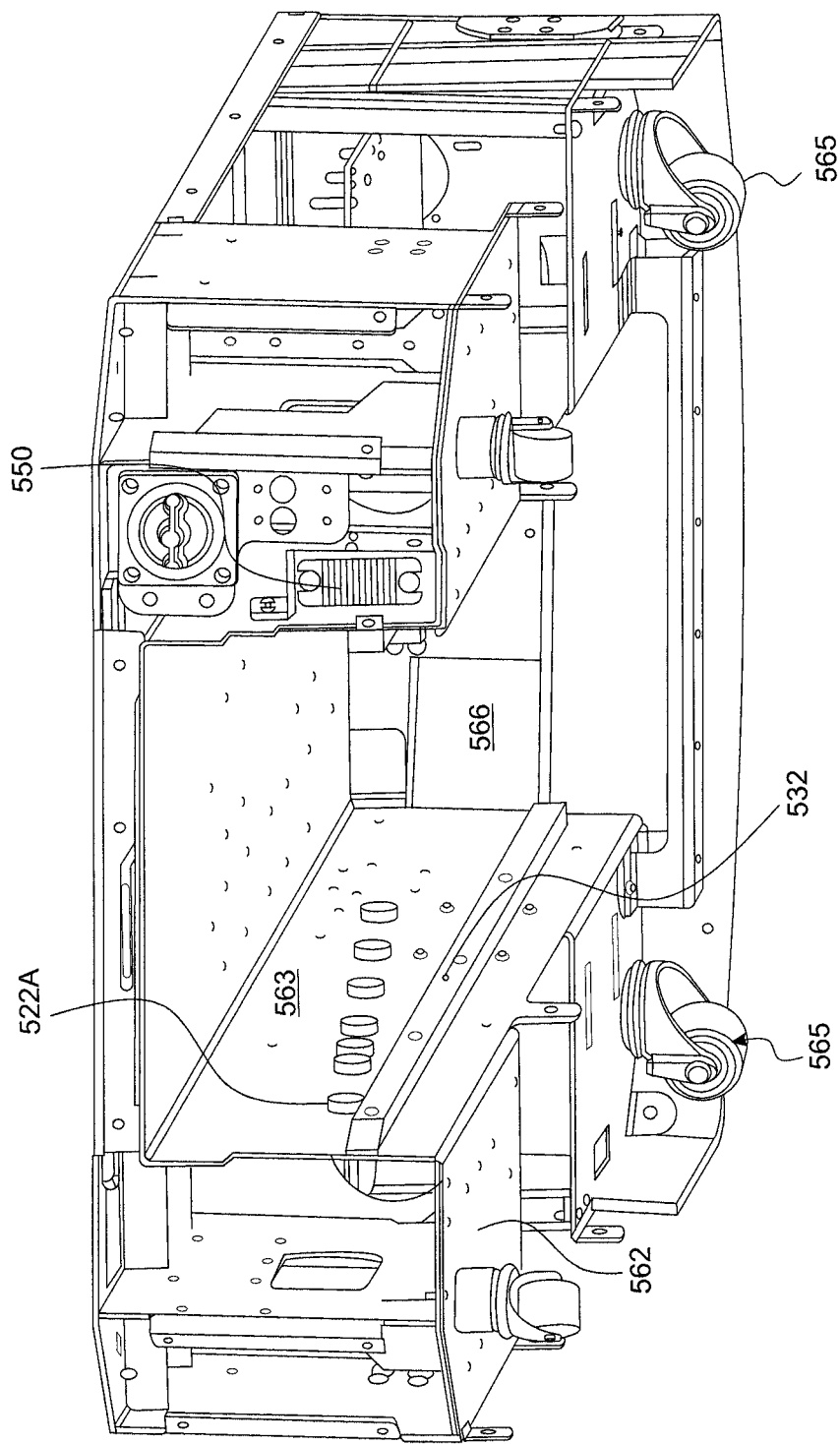
FIGS. 5A and 5B are bottom and side perspective views, respectively, of an internal cavity within a mobile base of a mobile manipulation robot in accordance with certain aspects of the present invention.

As shown in FIG. 5A, the cavity of the battery powered device, such as a cavity in the mobile base (160, 260, 360) of the mobile manipulation robots (100, 200, 300), may include a left side wall 563, a closed back wall 566, a right side wall (not shown) and an open front. The field replaceable battery 400 may be positioned (e.g., rolled on wheels 440A, 440B) for connection by positioning the back side wall 435 of the battery 400 proximate to the open front of the cavity in the battery powered device. The connection rails (420A, 420B) may engage a complementary connection means on each of the right and left side of the cavity.

For example, shown in FIG. 5A is a set of roller wheels 522A on the left side wall 563 of the cavity, which are attached at an angle that deviates from the longitudinal axis of the side walls of the cavity by the same amount, or by a similar amount, as the angle 472 by which the rails on the field replaceable battery 400 deviated from the longitudinal axis 470 of the main body thereof. That is, the connection wheels on each side wall of the cavity extend upward from a front of the cavity toward a back wall 566 of the cavity with respect to the longitudinal axis thereof. The connection means of the cavity may be positioned along at least a portion of the inner cavity wall, such as along a length on the inner cavity wall which is the same as, or similar to, the length of the rail on the side walls of the field replaceable battery.

Connection of the field replaceable battery with the battery powered device is as simple as positioning the back side 435 of the battery 400 proximate the open front side of the cavity, and pushing the battery into the cavity. The connection means on the outer side walls of the main body of the battery will engage with the connection means on the inner side walls of the cavity so that when the field replaceable battery is pushed into the cavity of the battery powered device, the battery is lifted into the cavity with a bottom of the battery suspended above the ground surface (e.g., floor). In this way, the wheels (440A, 440B) of the field replaceable battery are lifted/elevated off of the ground surface.

While the connection means on the main body of the field replaceable battery are shown to be rails, and the connection means on the inner side walls of the cavity in the battery powered device are shown to be roller wheels, other arrangements are envisioned and within the scope of the present application. For example, the connection means on the main body of the field replaceable battery may be roller wheels, and the connection means on the inner side walls of the cavity in the battery powered device may be rails. Moreover, interlocking rails or other complementary connection means may be included on both the field replaceable battery and the cavity. Additionally, while the cavity is defined as having side and back walls, any means to secure the connection means is within the scope of the present invention, such as additional rails or structural features.

Figure 5B:
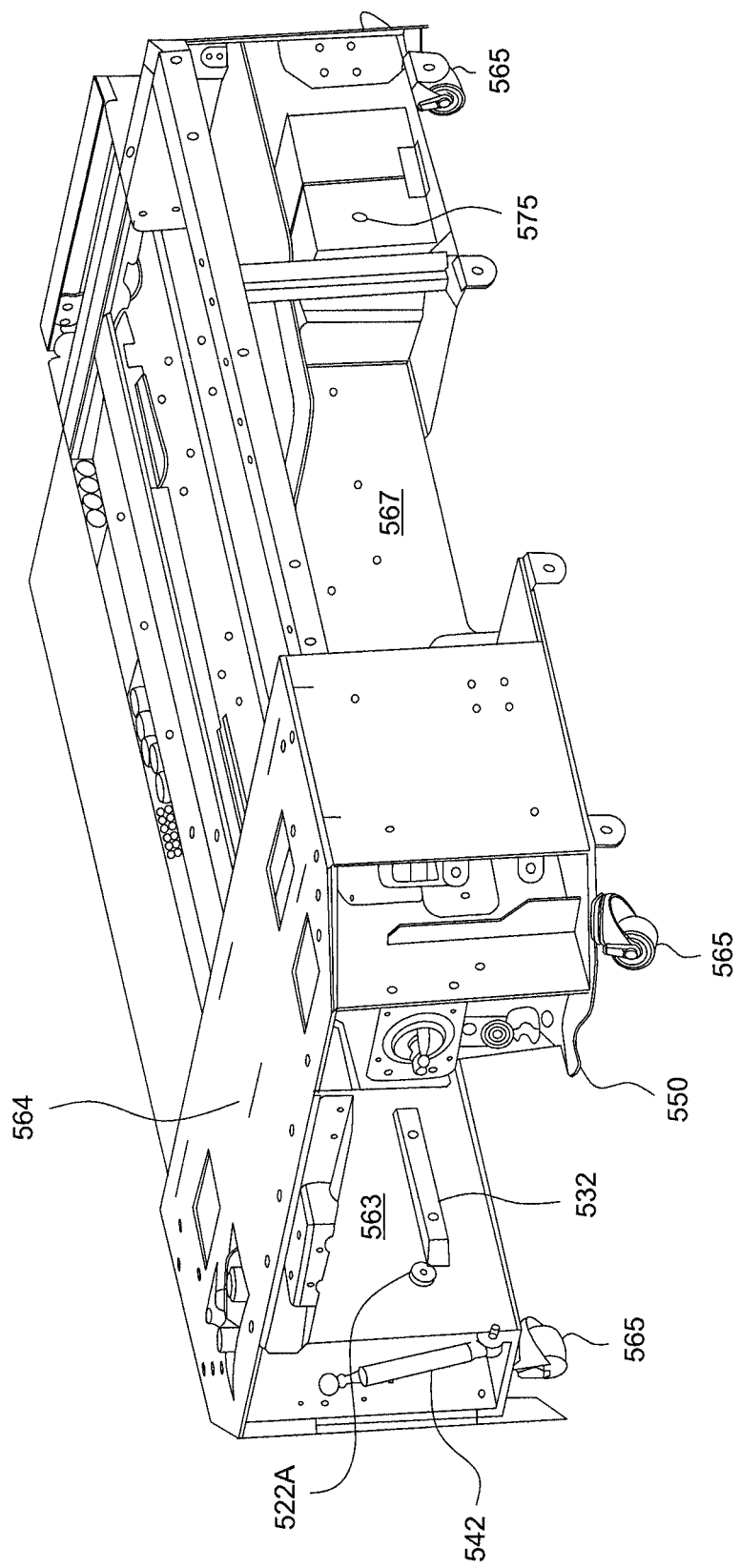

Either or both of the field replaceable battery and the cavity of the battery powered device may include additional alignment means which may assist in positioning the field replaceable battery during connection with the cavity. For example, as shown in FIGS. 5A and 5B, the alignment means may include protrusions or rails 532 on the inner side walls of the cavity which may laterally position the field replaceable battery 400 within the cavity. While the alignment means are shown as rails on the inner side walls of the cavity, they may alternatively, or additionally, be positioned on the side walls of the main body of the battery powered device. Moreover, while the alignment means are shown as rails, they could also be projections, wheels, etc.

For reference, FIGS. 5A and 5B also label bottom and top walls of the battery powered device (562 and 564, respectively), and an outer side wall of the battery powered device 567. The battery powered device may be part of a mobile manipulation robot, and as such, the region depicted in FIGS. 5A and 5B may be an internal structural portion of the mobile base of the mobile manipulation robot, such as those depicted in FIGS. 1A, 1B, 2, 3A, and 3B (100, 200, 300). As such, various other components may be included in the region surrounding the cavity, such as wheels 565 (e.g., wheels 165 of FIGS. 1A and 1B), shocks 542, and additional batteries 575.

Once the field replaceable battery 400 is fully inserted (pushed) into the cavity of the battery powered device, an electrical connection may be established between the two via a connector. A preferred connector includes a blind mate connector the field replaceable battery which may be configured to make an electrical connection with a blind mate connector on the battery powered device. Shown in FIG. 4B is a blind mate connector 450 on a back side of the front wall 425 of the main body of the field replaceable battery 400. This blind mate connector is configured to engage a corresponding blind mate connector 550 on the battery powered device (see FIGS. 5A and 5B) to electrically connect the at least one battery cell of the field replaceable battery 400 to power supply circuitry of the battery powered device (e.g., the mobile manipulation robot) when the field replaceable battery 400 is installed in the cavity.

While the blind mate connector on the field replaceable battery and the battery powered device are shown in one specific position on each, such as toward a front of the field replaceable battery and the cavity of the battery powered device, other positions are possible and within the scope of the present invention. For example, the blind mate connectors may also be positioned toward a back of the cavity and on a back wall of the field replaceable battery, or may be position on a top of the field replaceable battery and on a upper surface of the cavity of the battery powered device.

The field replaceable battery 400 may further include a locking handle 430 having a locked position and an unlocked position. For example, the locked position may be configured to lock the field replaceable battery 400 in an engaged position on the battery powered device. In the engaged position, the field replaceable battery 400 is fully pushed into the cavity of the battery powered device and the blind mate connectors on each (450 and 550, respectively) are connected to provide electrical connection between the field replaceable battery 400 and the battery powered device. The unlocked position of the handle may be configured to allowed movement of the field replaceable battery 400 within the cavity of the battery powered device (e.g., insert or remove the battery from the cavity on the battery powered device). The locked position may be a position of the handle which is rotated with respect to the unlocked position, such as by 90 degrees or even 180 degrees, or a position which is pulled out or pushed in with respect to the respect to the unlocked position, or any combination thereof.

As indicated above, the field replaceable battery 400 includes at least one rechargeable battery cell. Further, the field replaceable battery 400 may include a charge sensor configured to sense a charge state of the at least one battery cell, and a circuit electrically connected to the charge sensor for receiving a signal indicative of the charge state of the at least one battery cell. Additional sensors may be included which register a temperature, voltage, current, etc. of the at least one battery, and such information (data) may also be relayed via a circuit. Additionally, when more than one battery cell is included in the field replaceable battery, each individual battery may include a charge sensor (and optionally additional sensors), which may communication via individual circuits, or may communicate directly, to a battery management system. Such a system manages a rechargeable battery (cell or group of cells), such as by protecting the battery from operating outside its safe operating area, temperature, voltage, etc.; and by monitoring its state, calculating secondary data, reporting that data, controlling its environment, authenticating it and or balancing the usage of individual cells in a groups of cells.

The cover 410 on the main body of the field replaceable battery 400 may be configured to provide access to an internal compartment of the main body comprising the at least one battery cell, the charge sensor and circuit, and any other additional relays or circuitry contained therein (e.g., relays, communication wiring, electrical connection wiring, charging management PCA, etc.). The cover 410 may be hinged; may snap onto top edges of the front, back, and/or side walls; may screw into top portions of the front, back, and/or side walls; or any combination thereof.

The field replaceable battery 400 further includes a connection means for an external power source which may provide for recharging of the at least one battery cell. For example, the external power source may be provided by AC power from a wall outlet, and the connection means may include a standard power cord. Alternatively, the external power source may be provided by a battery docking station which acquires power from a standard wall outlet. The battery docking station may provide power to the field replaceable battery via direct contact between one or more electrical charging contacts. The battery docking station may provide power to the field replaceable battery wirelessly. Moreover, more than one means for recharging may be included on the field replaceable battery 400.

According to certain aspects of the present invention, the field replaceable battery may be part of a power management system that may also include a backup battery to provide power to the battery powered device when the field replaceable battery is removed or fully discharged. Moreover, the power management system may include the battery docking station or AC plug as described hereinabove. The field replaceable battery may indicate a charge status on a visible face of the main body either through one or more lights or a visible readout. Alternatively, or additionally, the field replaceable battery may indicate the charge status by an audible signal that may change (e.g., start at a certain charge state, grow louder and/or increase frequency of signal, etc.) as the battery is progressively discharged.

According to certain aspects of the present invention, the battery powered device may be a mobile manipulation robot. As such, the present invention further provides a power system for a mobile manipulation robot which includes the field replaceable battery described hereinabove, and a backup battery configured to provide power to the mobile manipulation robot when the field replaceable battery is removed or fully discharged (see for example reference number 575 in FIG. 5B).

Power management in mobile robotic applications can be critical to optimal system performance. As such, the power status of the field replaceable battery may be monitored via a battery management system power control assembly (PCA). Recharging of a depleted battery may be monitored for efficient and complete charging. Moreover, the modularity of the field replaceable battery enables the rapid removal and installation of a charged field replaceable battery. In addition, the internal guide rails/slides assist by providing a lifting, elevating motion to the field replaceable battery as it is inserted/plugged into the mobile manipulation robot connector. The field replaceable battery slides into the mobile manipulation robot with a slow, steady motion and is gently lifted into the cavity in the mobile base until the blind mate connection is made at the end of the insertion motion. The design provides for insertion guidance in all the degrees of freedom that affect the insertion motion.

The further inclusion of a battery backup system (575 of FIG. 5B) allows the mobile manipulation robot to remain powered on and running during removal of a depleted battery and insertion of a fully charged battery. This battery backup system provides a productivity and uptime benefit to the user as the software restart time is eliminated since the system software status is maintained and functioning during the field replaceable battery replacement procedure.

Figure 8:
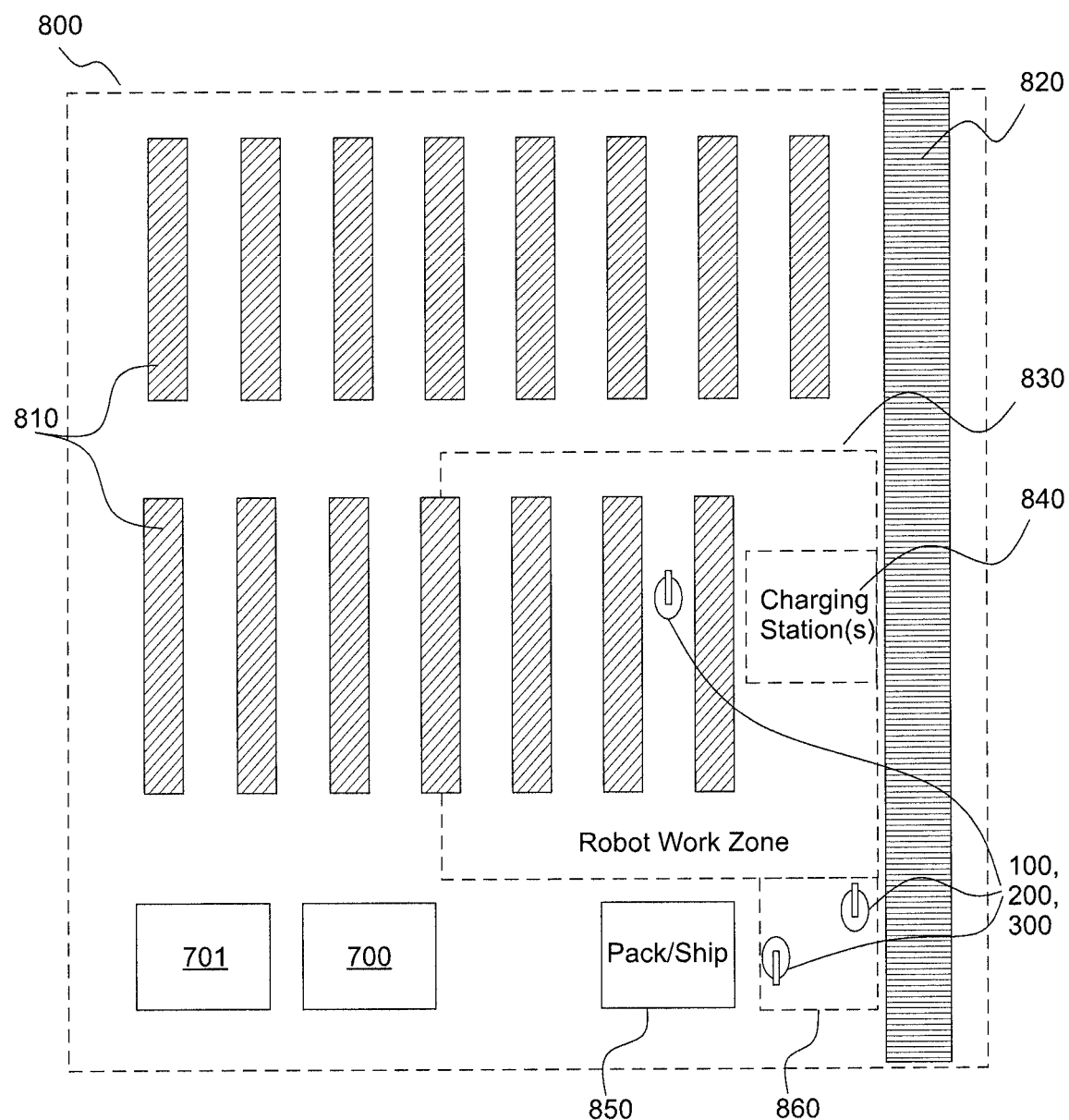
FIG. 8 is a simplified overhead floor plan diagram of a representative logistics facility.

Exemplary mobile manipulation robots may include those depicted in FIGS. 1A, 1B, 2, 3A, and 3B, which may use advanced communication systems as shown in FIG. 7 to perform in a specific environment, such as the logistics facility depicted in FIG. 8.

FIGS. 1A and 1B are front and side views of a mobile manipulation robot 100 according to certain aspects of the present invention. Internal details of software components of the mobile manipulation robot and software relevant to a system which includes at least one mobile manipulation robot are shown in FIG. 7, which provides a block diagram of a system comprising a central server 700 and at least one mobile manipulation robot (100, 200, 300). The server may have an electronic communications interface (server communication interface 740) that connects with an electronics communication interface on the mobile manipulation robot(s) (remote communication interface 710). This connection may be established through a wireless network via a wireless access point. Various other types of communication are possible and may be used in addition to, or as an alternative to wireless communication, such as a tethered wire connection or other point-to-point wireless data exchange.

With specific reference to FIGS. 1A and 1B, and FIG. 7, the mobile manipulation robot 100 may have a wheeled mobile base 160, an internally positioned battery 190 such as the field replaceable battery 400, and an onboard computer processor 718 with memory storage 716. The mobile manipulation robot may also have at least one temporary storage bed 140 for picked items and at least one robotic manipulator arm 120. The onboard computer processor 718 may be configured to run a set of programs with algorithms capable of performing navigation and picking. Further, the onboard computer processor 718 utilizes data from sensors (150, 110) to output control signals to the mobile base 160 and manipulator arm 120 for navigation and picking, respectively.

Moreover, the onboard computer processor 718 may be configured to run a set of programs with algorithms capable of receiving signal data from the charge sensor and/or a circuit connected to the charge sensor, both associated with the at least one battery cell of the field replaceable battery 400. The signal data may indicate a charge state of an engaged field replaceable battery 400 (i.e., battery engaged in the cavity of the mobile base). The onboard computer processor 718 may be configured to run one or more programs which would alter a navigation path of the mobile manipulation robot when the charge state of the battery cells in the field replaceable battery is low, or below a set threshold point. Alternatively, or in addition, the onboard computer processor 718 may be configured to run one or more programs which would communicate the charge state of the at least one battery cell in the field replaceable battery to a central server 700, and receive navigation and/or pick instructions from the central server based on the charge state of the at least one battery cell.

The onboard computer processor 718 may also have local persistent memory storage 716 which stores specific information relevant to the configuration of each manipulation robot (100, 200, 300). Such information may include sensor calibration data, battery usage data (e.g., rate of use for specific activity loads, etc.), actuator tuning parameters, and other platform specific data. The onboard computer processor 718 may also communicate with the central server 700 to receive pick order information and respond back with confirmation data to inform the central server 700 of successful picks or any errors that might occur.

Each manipulation robot (100, 200, 300) may also have a user interface (130, 230, 330) which includes a graphical display monitor and an input device, where the input device may be a touch screen, a track ball, voice command, a keyboard, input buttons or any combination of these devices and possibly others. The user interface (130, 230, 330) allows a user to command and control each mobile manipulation robot to perform localized tasks and to enter product picking dispatch information manually, thus sending the robot on its mission. For example, a status of the field replaceable battery may be displayed on the graphical display monitor, and a user may interact with the mobile manipulation robot through the graphical display monitor to change the navigation instructions based on that status.

Additionally, according to the presently disclosed invention, each mobile manipulation robot may contain an external swappable memory port on a side, where necessary information may be uploaded to the robot directly when the operator inserts a data storage device, thus by-passing the wireless communication to the server. The data storage device may be a disk, USB flash device, or other form of external memory storage device. The data may also be transferred through proximity communication technologies, such as near field communication (NFC), Bluetooth, or short-range radio-frequency identification (RFID) standards.

Each manipulation robot (100, 200, 300) may also be equipped with safety features which can include: one or more safety lights or strobes (155, 255, 355), an audible warning annunciator or horn, one or more emergency stop buttons 157, the ability to display fault, error, battery charge status, and/or intended action (such as navigation turn signal) information on the user interface (130, 230, 330) or at some other point on the manipulation robot, or any combination thereof.

Furthermore, each manipulation robot 100 may be configured to receive signals from the central server 700, or directly from the warehouse management system (WMS) 701, which may indicate an emergency and may direct the mobile manipulation robot (100, 200, 300) to stop and/or may further activate the one or more safety lights or strobes (155, 255, 355) and/or audible warning annunciator or horn. In the event that an unstable and/or unsafe diagnostic state for the mobile manipulation robot (100, 200, 300) is detected by the one or more robot processors 718, the mobile manipulation robot may be stopped. The mobile manipulation robot (100, 200, 300) may also be stopped if the sensors (150, 110 and 350, 310) detect a human or obstacle in close proximity, or detect unsafe operation of the mobile manipulation robot. Such signals may be processed by the robot processors 718 and/or at the central server 700 to control the robot speed and or direction of operation.

The mobile manipulation robots disclosed herein may use an articulated robot manipulator arm (120, 220, 320) to pick pieces with the common variability found in item size, shape, weight and placement within a logistics facility. Common logistics storage infrastructure, such as an ordinary shelf or rack, does not constrain any item location and orientation for the purposes of any deliberate accuracy, therefore, in order for a robot to do a pick at random it must have sufficient freedom to grasp an item in various configurations. As such, a high degree-of-freedom robot manipulator arm (120, 220, 320) may be used to provide the manipulability necessary to pick an item in any configuration in which it is found.

With continued reference to FIGS. 1A, 1B, 2, 3A, and 3B, the mobile manipulation robot (100, 200, 300) may physically adjust for variations in item location and orientation which may be determined from sensor (110, 310) information prior to the pick. The manipulator arm 120 may be mounted to the robot frame 125 at a position on top of the mobile base 160 of the manipulation robot 100. The manipulator arm 120 enables the robot to reach multiple shelf level heights.

The vertical reach of a robot may be extended, for example, by mounting the manipulator arm 120 on a vertical actuator stage, such as shown in FIGS. 2, 3A, and 3B, wherein the manipulator arm is mounted on a distal end 342 of the vertical actuator stage which includes the storage bed or platform 356 that may hold pieces or totes (145, 245). The vertical actuator stage (240, 340) would be able to raise and lower the manipulator arm (220, 320) so an end effector (275, 375) can reach both higher and lower pick locations.

Providing lift to the vertical actuator stage having the mobile manipulator arm attached at a distal end thereof may require significant power. Even in the empty state (i.e., empty of items or totes), the vertical actuator stage and the mobile manipulator arm may represent significant weight. In an effort to reduce the power required to move the vertical actuator stage, the mobile manipulator robot may include a unique lift counterbalance system.

The design and application of the lift counterbalance system is generally for the purpose of conservation of energy, and to create an assist mechanism to aid the mobile manipulator robot to raise the vertical actuator stage and loads thereon for the proper function of the system. The disclosed dual spring system generally includes the following system elements: 1) spring support/structure tubes for connecting and supporting the spring components, 2) springs that provide the energy storage medium and reside inside the support/structure tubes, 3) two tapered cable accumulation cones that provide a variable loading feature to the springs, 4) cables for connecting the vertical actuator stage to the counterbalance spring system, 5) inner polymeric tubes that extend a portion of or the entire length of the support tubes and fit in between the support tubes and springs, providing an insulation barrier and sound damping feature to the system, and 6) two pulleys which guide the cables to the robot lift mechanism. The system may further include 7) a dual locking, spring retention system that is configured to retain the spring load as it builds from the rotation of the spring tubes and springs, such as a ratcheting, spur and latch, in addition to providing an anti-rotation/retention feature should the wire cables fail, 8) a quick release clevis pin attachment-detachment device included for ease of assembly and service of the mobile lift counterbalance system, and 9) a manual spring tensioning (see 631 of FIG. 9B, manually tensioning tool attachment point) capability provided by a tool connection point/part on the end of each spring end.

As shown in FIG. 3A, a mobile manipulator arm 320 may be attached on a distal end 342 of the vertical actuator stage 340, which may be attached to a main body case 315 of the mobile manipulation robot 300 in vertical tracks 380. A centering or alignment track 354 may also be included on the main body case 315 which may further stabilize and/or align the vertical actuator stage 340 during movement (i.e., raising or lowering relative to the main body case 315). Furthermore, a back plate 352 may be included on the vertical actuator stage 340 which may protect objects or totes placed thereon.

Figure 6:
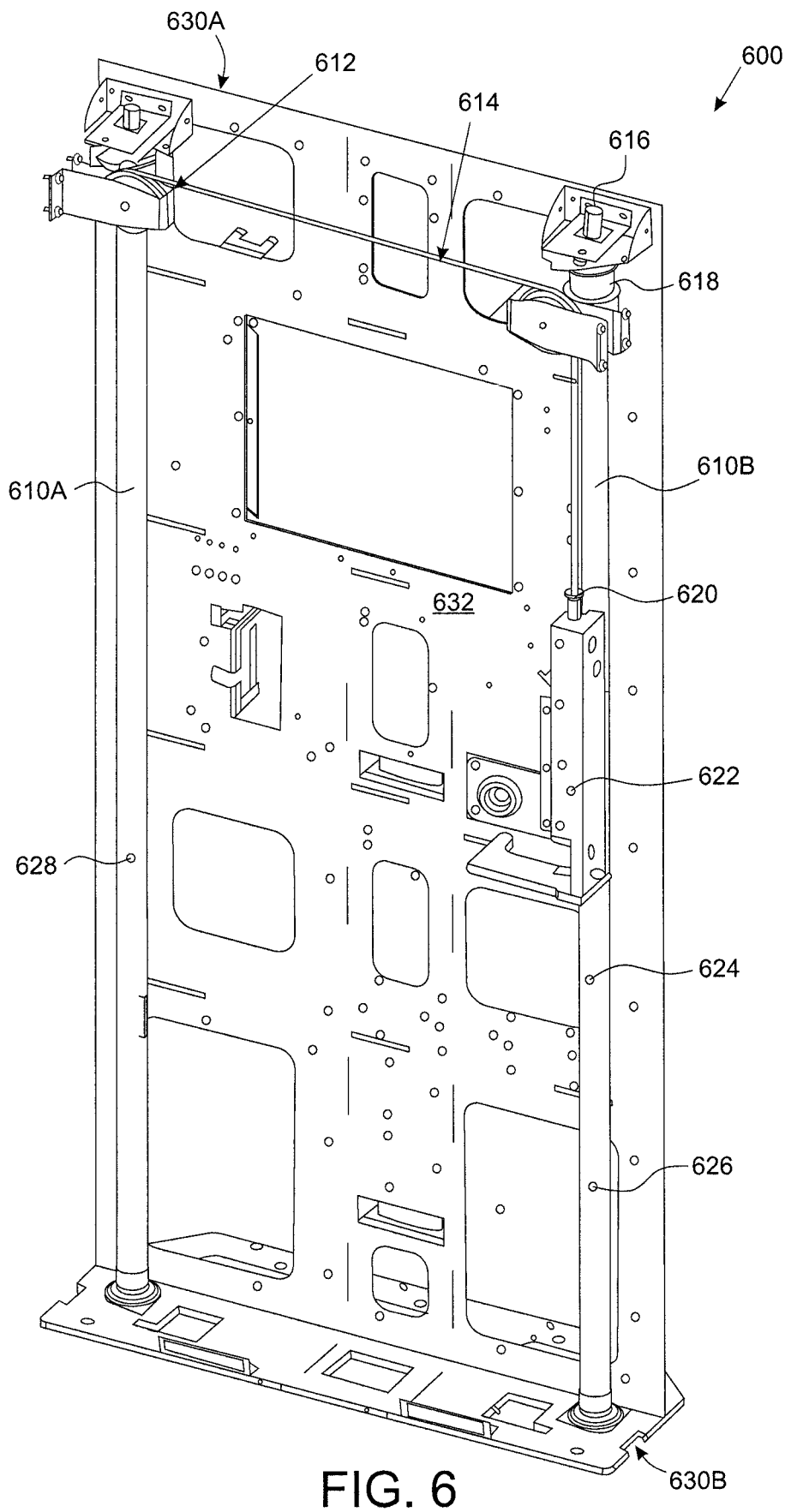
FIG. 6 is a front perspective view of an internal panel of a mobile manipulation robot showing a counterbalance system in accordance with certain aspects of the presently disclosed invention.
Figure 9A:
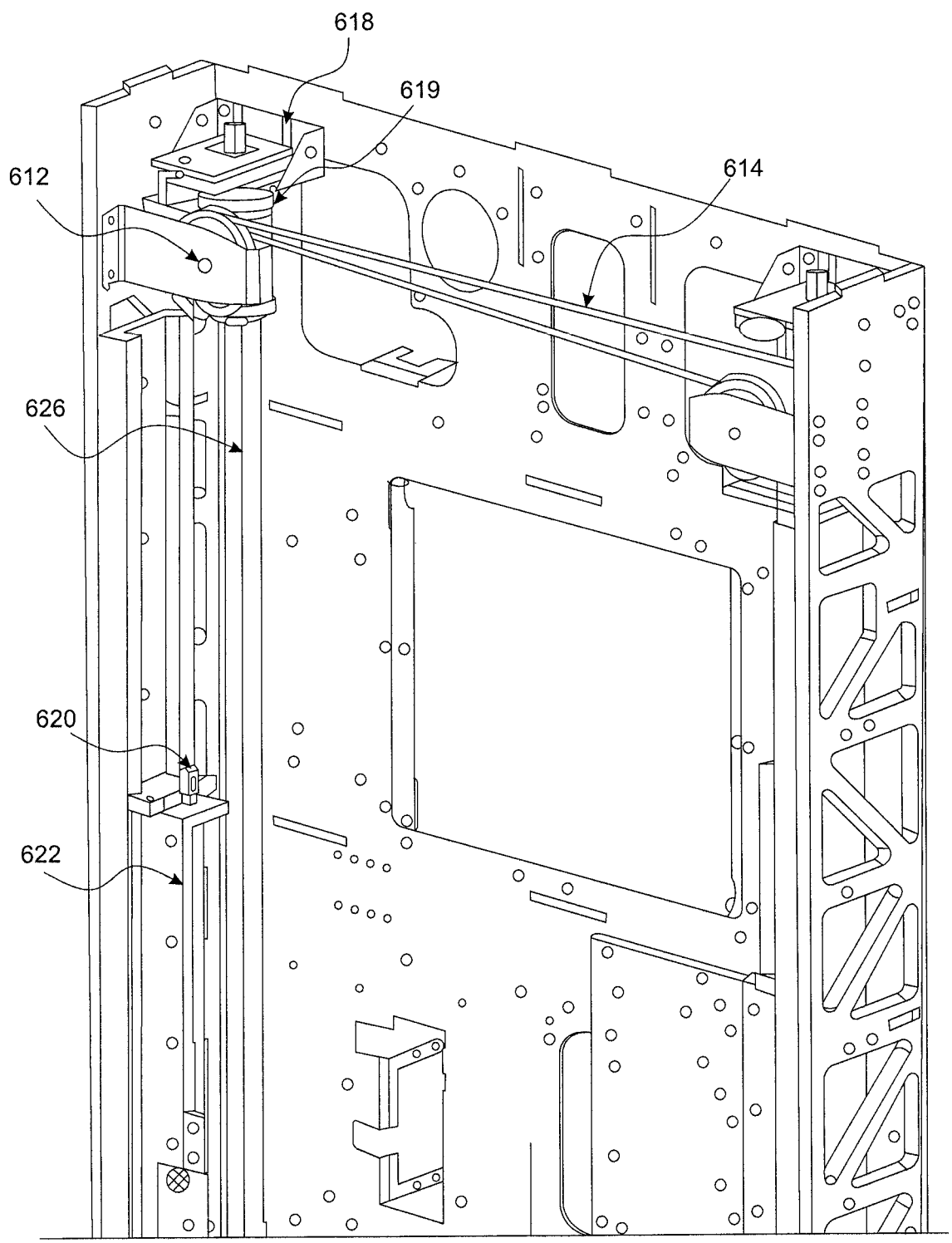
FIG. 9A is a close-up view of a counterbalance system in accordance with certain aspects of the present invention.
Figure 9B:
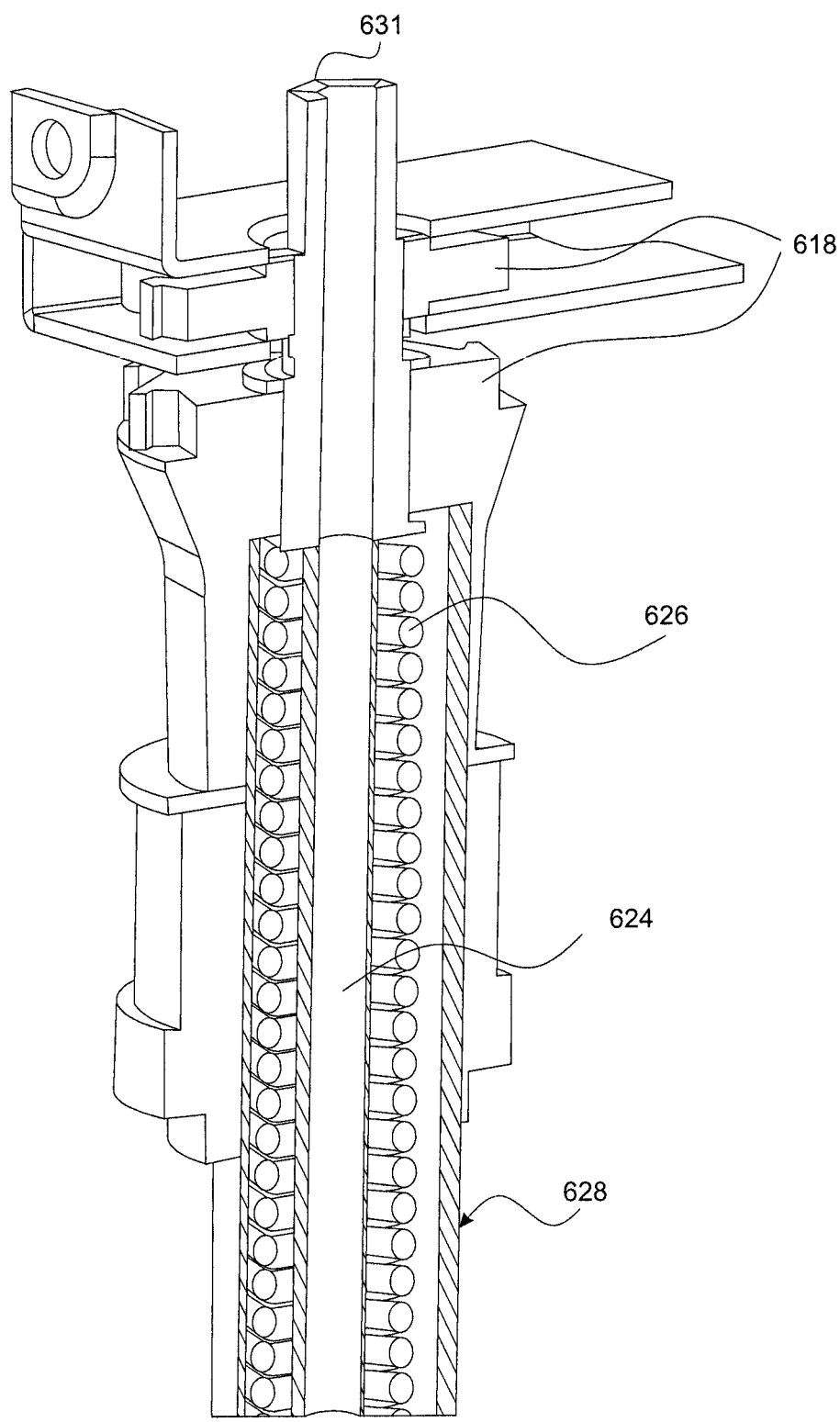
FIG. 9B is a cross-sectional view of a left uppermost region of FIG. 9A.

The mobile manipulation robot 300 may include the counterbalance system 600 on an inside of the main body case 315. With reference to FIGS. 6, 9A, and 9B, the lift counterbalance system 600 generally includes a coil spring assembly (610A, 610B) comprising a tensioning spring 626, an outer cylinder cover 628, and an inner polymeric cylinder 624. The tensioning spring may be attached via an end thereof to the outer cylinder, and via an opposite end to a fixed point on the mobile manipulation robot, such as to a panel (see 632 of FIG. 6), so that rotation of the cylinder may generate tension on the spring. The inner polymeric cover 624 may be positioned between the outer cylinder cover 628 and the tensioning spring 626, or may be positioned on the inside of the tensioning spring (see FIG. 9B).

Alternatively, the tensioning spring may be attached via an end thereof to a tapered cable accumulation cone, and via an opposite end to a fixed point on the mobile manipulation robot, such as to the panel 632, such that rotation of the cone may generate tension on the spring. The inner polymeric cylinder 624 may be positioned between the outer cylinder cover 628 and the tensioning spring 626, or may be positioned on the inside of the tensioning spring (see FIG. 9B).

Alternatively, a winding shaft may be positioned within the tensioning spring and attached to an end of the tensioning spring, the other end of the tensioning spring fixed a point on the mobile manipulation robot as indicated above, such that rotation of the winding shaft may generate tension on the spring. The outer cylinder may cover the tensioning spring, and the inner polymeric cylinder may be positioned between the tensioning spring and the winding shaft. In this case, the tensioning spring may be attached via an end to the winding shaft, and rotation of the winding shaft may generate tension on the tensioning spring.

A unique feature of the lift counterbalance system 600 disclosed herein is the inclusion of the inner polymeric cylinder, which may reduce vibration of the tensioning spring and thus may dampen noise generated when the tensioning spring is rotated (e.g., by the outer cylinder, cable accumulation cone, or winding shaft).

The presently disclosed counterbalance system further comprises a cable accumulation cone operatively attached proximate an end of the coil spring assembly (610A, 610B). A cable 614 may have a first end attached to the cable accumulation cone and a second end attached to a lift mechanism 622, such as a lift mechanism attachable to, or part of, the vertical actuator stage 340 of the mobile manipulation robots disclosed herein. For example, and with reference to FIG. 3A, when the lift counterbalance system is housed within the main body case 315 of the mobile manipulation robot 300, a portion of the lift mechanism 622 may extend through the vertical tracks 380 of the main body case 315 and attach to the vertical actuator stage 340.

The lift counterbalance system may further include a pulley 612 configured to guide the cable 614 between the cable accumulation cone and the lift mechanism 622. Movement of the lift mechanism 622 downward may pull the cable 614 from the cable accumulation cone through the pulley 612 and rotate the coil spring to increase tension on the cable 614. The cable accumulation cone may be tapered to provide a variable load to the tensioning spring. As such, downward movement of the vertical actuator stage may generate an even tension on the spring and thus an even load on a motor used to provide the movement to the vertical actuator stage. Moreover, the lift counterbalance system acts to reduce the overall load on this motor, such that a much smaller, lighter weight, lower power motor may be enabled to provide movement to the vertical actuator stage. This lessens the power load on the battery used to power the mobile manipulation robot (e.g., the field replaceable battery detailed herein).

Additionally, the inner polymeric cylinder may dampen noise produced during rotation of the coil spring.

The lift counterbalance system may further include a locking mechanism 618 configured to retain a tension of the coil spring upon rotation thereof and in the event the cable 614 breaks or is disconnected. Exemplary locking mechanisms include a ratcheting, spur and latch systems.

The lift counterbalance system may further include a quick release mechanism 620, such as a clevis pin, to disconnect the lift mechanism 622 from the cable 614. According to certain aspects of the lift counterbalance system, the cable accumulation cone may be attached to an end of the tensioning spring, or may be attached to an end of the winding shaft.

The lift counterbalance system 600 may be attached to an internal vertical panel 632 having a top end 630A and a bottom end 630B. The pulleys 612 may be position near a top end 630A of the panel 632 so that as the lift mechanism 622 moves downward, the cable 614 pulls away from a top of the coil spring assembly (610A, 610B) and rotates the tensioning spring therein. This rotation increases a tension of the tensioning spring, acting to counterbalance the load of the vertical actuator stage 340. As shown in FIG. 6, the mobile manipulation robot may include two coil spring assemblies, wherein a cable from a left assembly 610A may connect to a right lift mechanism 622 via a pulley on the right, and a cable from a right assembly 610B may connect to a left list mechanism (e.g., in a crisscross fashion). Each of the left and right list mechanisms will act on the left and right sides of the vertical actuator stage, respectively, to counterbalance the load on the stage.

The vertical actuator stage (240, 340) may comprise a conveyance means such as rollers, which may improve movement of a tote 245 onto or off of the stage (platform). Alternatively, the vertical actuator stage (240, 340) may comprise a mechanically actuated conveyance device that allows for automatic transfer. The conveyance device may be a small conveyor belt or may be a set of rollers or wheels which is capable of shifting the tote 245 to and from another platform or conveyance (see 820 of FIG. 8, or a retrieval queue of a pack and ship area 850, or a retrieval queue of a replenishment area).

Additional high degree-of-freedom robot manipulator arms (120, 220, 320) may be included which may provide additional lift capability to pick objects of various shapes and sizes when the arms work cooperatively, or to pick more than one object at a given pick location using arms working in parallel but independently. For multi-arm robots, the arms may be the same or may have different kinematic configurations, and may have the same or may have different end effectors.

The mobile manipulation robot (100, 200, 300) may use a grasping end effector (175, 275, 375) on the manipulator arm (120, 220, 320) to pick items from their stored location and transfer them to a temporary location, or vice-versa. The grasping end effector may be a suction cup, which may be connected to a vacuum pump through an onboard computer processor 718 controlled valve. The vacuum suction at the suction cup may be engaged and disengaged by actuating the valve, thereby allowing the manipulation robot to grasp the desired pick item on contact and then release it when necessary. The use of a suction cup also allows the robot to grasp a target piece at a single point and orientation, which reduces the computation time required for the system to determine how to grasp the pick item.

Alternatively, the end effector may be a mechanically actuated gripper such as, for example, a robotic hand having articulated digits. The end effector may be a simple gripper, an electroadhesion end effector, a magnetic end effector, or combinations thereof, and the robots may comprise an end effector swap mechanism configured to permit a change of the end effector. Exemplary magnetic end effectors may utilize electromagnets, permanent magnets, or magnet arrays which provide opposing magnetic fields. An electroadhesive end effector may use reversible electrostatic adhesion to grip an item while it is picked and put. When an electroadhesive or magnetic end effector is used, such may be powered by an electrical power supply configured to generate an electrostatic or magnetic adhesive force that is used to releasably adhere the item to the end effector. The onboard computer processor 718 (see FIG. 7) may control the power supply to activate and deactivate the electrostatic or magnetic adhesive force of the end effector.

The decision to use of one, various interchanged, or a combination of end effector technologies is driven by the physical properties of the objects to be grasped so that a sufficient amount of lift force is generated to carry the objects by the manipulator arm without causing damage or visible alterations to the objects.

The presently disclosed system design may also include an extension tool (170, 270, 370) mounted at the end of the robot manipulator arm (120, 220, 320), as shown in FIGS. 1A, 1B, 2, 3A, and 3B. This tool (170, 270, 370) may enable the manipulation robot (100, 200, 300) to position the grasping end effector (175, 275, 375) at a sufficient depth into a storage rack so that the end effector may reach a desired item while maintaining clearance for the manipulator arm (120, 220, 320; i.e., so that the manipulator arm does not come into contact with the infrastructure). It may also enable the end effector (175, 275, 375) to reach into shelf corners where it would otherwise not have clearance for the robot manipulator arm (120, 220, 320).

Accordingly, the extension tool (170, 270, 370) may be sized based on specifics of the logistics facility such as, for example, shelf depth. That is, the extension tool may be long enough to reach into the back of a shelf, as mentioned above, so that the end effector may pick a piece placed therein. Furthermore, the extension tool may have a diameter that is smaller than the diameter of the end effector. This may allow the extension tool to reach into a shelf without obstructing the view of the end effector and/or the piece to be picked, and may simplify the computation required to locate the piece as no additional sensor information may be required to locate the extension tool; information regarding the end effector would be sufficient.

The extension tool (170, 270, 370) may be a replaceable or switchable part of the robot manipulator arm (120, 220, 320). In this way, logistics facilities having different configurations such as, for example, deeper shelving, may be accommodated by simply switching out the extension tool to one more suited for the work (e.g. a longer extension tool). Furthermore, in cases where an end effector (175, 275, 375) may require a different connection mechanism, the use of various extension tools having different connection mechanisms at the end used for connection to the end effector, may streamline switching an end effector on the robot manipulator arm. That is, the ability to switch out the extension tool to one having a suitable connection means for the desired end effector may improve the ease of use of the mobile manipulation robot (100, 200, 300).

After pieces are picked, they may be placed into the storage bed (140, 240, 340) for transportation. The bed may also carry a container (145, 245), such as a box or tote, in which the items can be placed. This method enables multiple items to be picked for a given order or batch of orders. This method frees the robot manipulator arm (120, 220, 320) to pick additional pieces without needing to take multiple trips to and from an order transfer area (see 860 of FIG. 8). Additionally, by carrying a packing box or container or transport tote onboard, the mobile manipulation robot (100, 200, 300) is able to aggregate order pieces together into a single container that can be easily swapped with a different container for additional order fulfillment.

The mobile manipulation robots may further include at least one sensor (110, 310) which may be positioned on the at least one mobile manipulator arm (120, 220, 320) such that rotation of the arm directs the at least one sensor toward the product to be picked for identification and localization. For example, the at least one sensor (110, 310) may be positioned on a central point of the mobile manipulator arm (see sensors 110 of arm 120 in FIG. 1A), or at a point 354 along the extension tool 370 (see FIG. 3A).

Positioned opposite the at least one sensor (110, 310) may be at least one opposite sensor that may be mounted such that once the mobile manipulator arm (120, 220, 320) angles itself to pick the product, the opposite sensor is now aimed directly into the storage bed (140, 240, 340) or transport tote (145, 245) where the product is to be placed. This opposite sensor may provide the data necessary to allow the onboard computer processor 718 (see FIG. 7) to analyze the storage bed or transport tote to find the optimal location to place the product, or an additional tote, considering that there might be previous objects already container thereon, or additional totes already contained thereon. Additionally, with two such sensors (110, 310) aimed in opposite directions, the system may be able to pick from the left or the right side of the mobile manipulation robot based on product location.

The storage bed (140, 240, 340) may comprise a calibration target which may be viewed by one or more of the sensors (110, 310) placed on the mobile manipulator arm (120, 220, 320). These centrally located sensors may be positioned to view the calibration target on the storage bed when the mobile manipulator arm is rotated. As such, information on the calibration target may be used to calibrate these sensors to ensure that all parameters are within specifications, and if not, update the parameters to reflect the current configuration. The dual use of the storage bed (140, 240, 340)—as a platform to hold picked items and as a calibration target—reduces the size profile of the presently disclosed manipulation robot and improves the accuracy of the system.

The location of one or more sensors (110, 310) on the mobile manipulator arm (120, 220, 320) may provide improved piece-picking accuracy. First, these sensors will have an unobstructed and enlarged view of the items to be picked and their storage locations, which is improved over the view that is provided by sensors placed at the end of a robotic arm or on the mobile base, as is the case in many prior art systems. Furthermore, sensors mounted at the end of a robotic arm may get in the way of, or reduce the range of positions available to, an end effector; sensors mounted on the mobile base may have their view of the items to be picked and their storage locations impeded by movement of the robotic arm.

Second, the location of the one or more sensors (110, 310) on the mobile manipulator arm (120, 220, 320) may provide improved measurement accuracy of the item to be picked. The mobile manipulator arm may move and articulate at more than one point along the arm, and each movement introduces potential error to any measurements that may be made between the end effector (175, 275, 375) and the items to be picked by sensors positioned on the mobile base (160, 260, 360). Placement of the sensors on the mobile manipulator arm may reduce this error by bringing the sensors closer to the items to be picked, and thus removing the error inherent in several points of articulation.

FIG. 8 shows an exemplary top view floor plan of a section of a logistics facility 800. The mobile manipulation robots may be included an a system and method which enables objects to be picked within a defined robot work zone 830 wherein stocked objects are stored on common commodity shelving 810. The system and method may define a plurality of transfer areas 860 in which items would be transferred to and from the mobile manipulator robot(s) 100 (and 200, 300 from FIGS. 2, and 3A and 3B, respectively). The transfer area 860 may possibly interface with a packing and shipping station 850, or a conveyor 820, or a staging area, or any combination thereof.

At the transfer area 860, a worker may remove the picked items or container (145, 245) holding the items from the mobile manipulation robot. If a container (145, 245) is removed, a new container could be transferred to the robot for fulfillment of the next order. The method may employ transfer of picked items or the container by a human operator or, the transfer of items may be automatic. That is, the onboard robot storage bed (140, 240, 340) may have a mechanically actuated conveyance device that allows for automatic transfer. The conveyance device may be a small conveyor belt or may be a set of rollers or wheels, which is capable of shifting the held pieces or container to and from another platform or conveyance.

Alternatively, the automatic transfer of objects from the onboard storage bed (140, 240, 340) may be performed by the manipulator arm (120, 220, 320) of the manipulation robot (100, 200, 300). The manipulation robot may transfer individual pieces by using its end effector (175, 275, 375) grasping mechanism or the robot may transfer a container carried in the storage bed by manipulating it with an extension tool (170, 270, 370) and end effector tool (175, 275, 375). The system may be designed to interface automatically with a separate conveyor system 820 which may be adjacent to the transfer area 860, whereby pieces or containers could be automatically moved through a conveyor 820 around a facility to and from a robot picking area 830. This method has the advantage of requiring less manual work to be done to transfer objects from a manipulator robot 100 after they are picked.

With reference to FIG. 7, the system's central server 700 may be used to process order information that is transacted with a WMS 701, and may coordinate the fulfillment of orders with a plurality of manipulation robots 100. All computation on the server 700 may be executed by one or more internal processors 720. The server may have two software modules that enable this order fulfillment coordination. The first processor may be a task dispatch module 728, which analyzes orders received from a WMS 701, and determines which of the plurality of manipulation robots 100 is to be assigned to an order. After a mobile manipulation robot is selected for picking an order, the task dispatcher 728 instructs the mobile manipulation robot with high-level order picking information, such as, route navigation paths, SKU locations, and an order drop-off location. The task dispatcher 728 works closely with a system state monitor 730 to obtain key feedback information from the system. The system state monitor 730 may communicate with the mobile manipulation robots to keep track of their current physical location within the facility, along with status information, which may include but is not limited to: whether the mobile manipulation robot is currently assigned an order, any faults or error modes, health information, such as remaining battery power, or charging status.

The central server 700 may also be used to store and process centralized SKU information in an SKU database 756, which stores information required by the robots to complete the order picking. The processing of this SKU specific information may be executed within a SKU analysis software module 726. The SKU information can include SKU size and shape data, which can include physical dimensions, 3D geometry that can include point and triangle mesh structures, item weight, appearance information that can include colorized texture maps, and may include SKU marking codes, that can include barcode and UPC data. Additionally, the central server 700 may store information in the SKU database 756 about the locations and regions on the surface of the individual SKU units that are allowed, or not allowed, for grasping by the mobile manipulation robot 100. This allows the manipulation robot 100 to grasp an item in a way that is known to be safe and stable, and prevents the robot from grasping an item at a point or in a way that is unsafe or unstable.

With continued reference to FIGS. 1A, 1B and 7, the onboard robot storage bed 140 may be configured to sense the weight of the piece placed thereon. This information may be communicated to the central server 700, and may provide additional verification that the correct SKU was picked, and that the item was properly transferred to the onboard robot storage bed 140. If the wrong weight is sensed in the storage bed 140, the manipulator arm 120 may be used to remove the item from the storage bed. The item may be replaced to the storage location by the manipulator arm 120, or a signal may be sent to the central server 700 requesting manual assistance, such as from a human pick worker. In the event that no weight is sensed in the storage bed 140, the manipulator arm 120 may be used to select another replacement item and/or retrieve the dropped item. Further, a signal may be sent to the central server 700 requesting manual assistance, such as from a human pick worker, or to alert the system to a change in the SKU inventory.

The central server 700 may also store information about the state of the SKU inventory in the SKU database 756, and may process this information in the SKU analysis module 726. Such information may include the position of items in their stored location, the location and orientation of grasping points for the robot to attempt to pick, and the sequence in which items of the same SKU type and approximate location should be picked from the shelf. This enables a sufficiently fast picking operation for the manipulation robot 100, such that picking geometry and sequencing can be planned and stored in memory 756 on the central server 700 or, and also, on the local storage 716, and does not need to be computed at the time of pick by a given manipulation robot 100. The central server 700 enables multiple manipulation robots 100 to share information about the state of inventory and plans for picking, so that different robots 100 can pick from the same storage location, without each one needing to sense and compute pick information.

Additionally, the central server 700 may store information about the infrastructure of the facility of operation in a map storage database 754. This can include information about the storage racks 310 such as shelving dimensions (width, depth and height), separate shelf level heights, shelf face widths, and rack column widths. The infrastructure information can be created, modified and analyzed through a map creation software module 724 on the central server 700. Using this module, a human operator can manually create a facility map or may load the map data from a predefined file, such as a Computer Aided Drawing (CAD) file, or may load mapping data automatically collected by a robot 100, which can use its onboard sensors (150, 110) to observe the facility infrastructure and automatically generate a map.

With reference to FIGS. 1A and 1B, the mobile manipulation robots 100 may have a set of sensors (150, 110) that enable autonomous navigation within a facility and sensors 110 that allow it to identify and localize individual SKUs for picking. The sensors (150, 110) may be 3D depth cameras, color cameras, laser ranging devices, or any combination thereof. These sensors (150, 110) may provide high resolution 3D point data to the manipulation robot 100 that details the presence of physical objects within the sensors (150, 110) field of view. The sensors (150, 110) may be connected to the onboard computer processor 718, which may process the 3D point and color data to extract information for navigation and picking. Alternatively, a unique set of sensors mounted on the manipulation robot 100 may be used for picking and for navigation. The manipulation robot may be programmed to point the sensors in a direction that is expected for the task.

In order to perform pick work, the mobile manipulation robots 100 may move and navigate between pick locations in the work zone 830 and an order transfer area 860 (see FIG. 8). During navigation the sensor data may be processed by the onboard computer processor 718 in a navigation software module 712 to extract two modalities of information. The first modality may be local mapping information that indicates which areas around the mobile manipulation robot 100 are traversable and which areas contain obstacles. The ground facing sensors 150 on the manipulation robot 100 are primarily used to generate this mapping information. There may be two ground facing sensors 150, a front-facing one and a rear-facing one. This unique design allows the mobile manipulation robot 100 to navigate while driving both forwards and backwards, which in certain picking scenarios, eliminates the need for the manipulation robot 100 to turn around, thus reducing travel time and increasing picking efficiency.

The second sensor information modality may be visual or audible landmark locations. According to the presently disclosed invention, the system may use landmarks such as visual markers, which may be placed ahead of time in fixed locations around the facility of operation. At least one of the onboard sensors (150, 110) may be used to detect these markers and locate the mobile manipulation robot 100 relative to them. This enables the robot 100 to know precisely where it is in the facility. Each marker may have a unique pattern that is different from other markers within the same facility. The unique marker pattern may be recognized by navigation module 712 algorithms which may be run by the onboard computer processor 718, thus allowing the mobile manipulation robot 100 to localize itself without ambiguity.

Exemplary landmarks include visual markers as described above, which may include any identifiable unique visual pattern, such as bar codes, numbers, letters, geometric shapes, or even a specific pattern of blinking lights, and audible markers, which may include at least unique patterns of sound or even specific tones of sound. Before a robot can use landmarks for navigation, the characteristics of the landmarks may be stored on the central server 700 or on the remote storage 716 of the robot. When the characteristics of the landmarks are stored on the remote storage 716 of the mobile manipulation robot 100, the robot may navigate autonomously through a logistics facility and may not require constant communication from the central server 700.

Additionally, careful attention may be given to the placement of markers, which may be vertically mounted on shelving 810. This allows the robot 100 to locate vertically mounted visual markers, because they are within the field of view of its arm mounted sensor 110. Vertically mounted markers are desirable because markers installed on the floor of a facility are more difficult to maintain. Floor markers are subject to tread damage from people and machines within the facility and therefore need more frequent maintenance.

In addition to onboard sensors (150, 110) and navigation software 712, the navigation process may also be aided by the central server 700. The server 700 may have access to the central facility map storage 754, which enables it to analyze the stored maps in depth and optimize routes between pick locations. As such, the central server 700 has a set of route planning algorithms in a software module 722 that allow it to pre-compute navigation routes within the robot work zone 830, and between the work zone 830 and any transfer areas 860. These routes can be stored after computation in a route storage database 752 within the central server 700, so that they can quickly be recalled and communicated to mobile manipulation robots 100, for rapid response during order fulfillment and for interchangeability between multiple robots 100.

To perform individual piece picks, onboard sensors (150, 110) may be used to detect and localize individual pieces along with the specific locations and orientations of the grasp points on the surface of a piece. During a pick, the sensors 110 also locate the infrastructure around the pieces such as shelving levels, rack columns, shelf faces and signage. This geometry information for the infrastructure is required for pick manipulation algorithms in a manipulation software module 714 to determine a pick trajectory that is collision free, such that the mobile manipulation robot 100 is able to grasp the piece without colliding with surrounding objects.

Special attention has been given to the placement of the picking perception sensors 110, which are mounted on the manipulator arm 120 in an orientation that allows them to see the pick location while the end effector 175 is positioned above the storage bed 140, as is shown in FIG. 1B. This method enables the system to localize additional pick pieces, grasp positions and orientations after a pick has been made and an item is being placed into the storage bed 140. This picking geometry information can be stored in memory 756, on the central server 700, or, and also, on the local storage 716 where it can be recalled later to enable sufficiently fast picks of the same SKU the next time it is required. Additionally, it is common for more than a single item of a particular SKU to be picked for an order. In this case, the perception and localization computation of additional pick items can be done at the same time the manipulator arm 120 is placing a previous pick in the storage bed 140, which may help to improve the speed and efficiency of picking multiple items which are in near proximity.

An additional "fine tuning" sensor may be added to the robot near the end effector tool 175 to help accurately perform a pick grasp. After the picking sensor 110 positively identifies and localizes a pick point, there may still be some positioning error present due to uncertainty in accuracy and calibration of the sensor 110. Therefore, a tuning sensor may be mounted at the tip of the end effector tool 175 on the robot 100 to more precisely locate the position of the tool 175 relative to the desired pick location. The tuning sensor would have the desired pick location in its field of view as the robot is attempting the pick grasp. As the manipulator arm 120 moves towards the desired pick location, the tuning sensor could be used to make small adjustments that guide the tool 175 toward the desired point.

The manipulator robots 100 have a mobile base 160 that is controlled by the onboard computer processor 718. The mobile base may have two main drive wheels 167, each driven by a servo motor. Each drive wheel 167 may have an encoder that provides motion feedback, which can be used to precisely control the speed of each wheel in order to achieve the desired rotation and translation velocities of the robot 100. The feedback data may also be used for odometry to estimate the motion of the robot 100 relative to the facility. The odometry may be responsible for guiding the robot 100 navigation at times when visual markers are out of sensor (150, 110) range. The mobile base 160 may also use passive wheels, such as casters 165, for stability and weight distribution.

All systems onboard the manipulator robot 100 may be powered from onboard batteries 190, which may be housed within the mobile base 160. The batteries 190, such as the field replaceable battery detailed herein, may supply power to the robot during navigation and picking for a limited time, and may be rechargeable to maintain operation through an economically viable work period. Battery charging may occur separately from the mobile manipulation robot 100, wherein a partially or fully discharged field replaceable battery may be swapped with separately charged field replaceable batteries for continued operation of the robot 100.

In a logistics facility, the mobile manipulation robot 100 may have a designated area of the facility 840 for recharging (see FIG. 8). For example, one or more docking stations and field replaceable batteries may be stored in the area, where they may also be recharged. A mobile manipulation robot having a partially or almost fully discharged field replaceable battery may navigate to the area 840, and a battery hot-swap may be performed by using permanently installed smaller short-life (minutes) onboard batteries, such as the backup battery 575 shown in FIG. 5B, to maintain power while the field replaceable battery 400 is replaced with a fully charged field replaceable battery. This prevents the mobile manipulation robot 100 from needing to power down during battery swap, which saves time. Hot-swapping may be done manually by a human operator, or may be done automatically by internal mechanisms of the mobile manipulation robot 100 and charging station being used to physically swap batteries 190 while the robot 100 coordinates the procedure.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention. For example, while both the field replaceable battery and the lift counterbalance systems have been described with reference to their uses in a mobile manipulation robot, they may easily find use in other systems and devices as would be understood by someone of ordinary skill in the art.

What is claimed is:

1. A mobile robot comprising:
    a mobile base comprising a cavity having a ground facing open bottom side, opposing first and second inner side walls, an open front end, and a closed back end, the cavity comprising a first device connection positioned on the first inner side wall and a second device connection positioned on the second inner side wall, wherein the first and second device connections are angled upward from the front end to the back end of the cavity;
    a field replaceable battery comprising:
        at least one battery cell,
        a main body having a top wall, a bottom wall, opposing first and second sidewalls, and opposing front and back ends, wherein the main body is configured to contain therein the at least one battery cell and the bottom wall of the main body is configured to enable movement of the field replaceable battery,
        a charging interface for connecting the at least one battery cell to an external power source,
        a blind mate connector electrically connected to the at least one battery cell and configured to engage a corresponding blind mate connector on the mobile base,
        a charge sensor configured to sense a charge state of the at least one battery cell, and a circuit connected to the charge sensor for receiving a signal indicative of the charge state of the at least one battery cell, and
        a battery connection on each of the first and second side walls of the main body, each of the battery connections angled with respect to a longitudinal axis of the main body, wherein the angle is upward from the front end to the back end of the main body so that engagement with each of the first and second device connections lifts the field replaceable battery into an engaged position that is elevated with respect to a disengaged position and a floor surface on which the mobile base resides, wherein the engaged position provides electrical connection between the blind mate connector on the field replaceable battery and a corresponding blind mate connector on the mobile base;
    a memory;
    one or more robot processors; and
    a remote communications interface,
    wherein the memory comprises computer program instructions executable by the one or more robot processors to receive the signal from the circuit indicative of the charge state of the at least one battery cell and send data to a central server via a wireless network.

2. The mobile robot of claim 1, further comprising:
    at least one manipulator arm comprising a first end portion pivotally carried by the mobile base, and a second end portion comprising an end effector, and an extension tool positioned at or near the second end portion and configured to provide access to an object without interference from surrounding objects or infrastructure within a logistics facility.

3. The mobile robot of claim 2, further comprising:
    a vertical actuator stage configured to raise and lower relative to the mobile base, wherein the at least one manipulator arm is mounted on the vertical actuator stage by the first end portion.

4. The mobile robot of claim 1, wherein the field replaceable battery further comprises a locking handle having a locked position and an unlocked position, wherein the locked position is configured to lock the field replaceable battery in the engaged position on the mobile base, and the unlocked position is configured to allow movement of the field replaceable battery within the cavity of the mobile base.

5. The mobile robot of claim 1, further comprising:
a backup battery configured to provide power to the mobile robot when the field replaceable battery is removed or fully discharged.

6. The mobile robot of claim 1, wherein each of the first and second device connections comprise rails and each of the battery connections comprise a set of wheels configured to engage the rails, or wherein each of the battery connections comprise rails and each of the first and second device connections comprise a set of wheels configured to engage the rails.

7. The mobile robot of claim 1, wherein the angle of the device connection is the same as the angle of the battery connection.

8. The mobile robot of claim 7, wherein the angle of the battery connections is at least 5° and not more than 45° relative to the longitudinal axis of the main body.

9. The mobile robot of claim 1, wherein each of the first and second device connections comprise a rail and the battery connection on each of the first and second opposing side walls of the main body comprise a set of wheels configured to engage the rails.

10. The mobile robot of claim 1, wherein the battery connection comprises a rail on each of the first and second opposing side walls of the main body, and each of the first and second device connections comprise a set of wheels configured to engage the rails.

11. The mobile robot of claim 1, wherein the main body of the field replaceable battery comprises fixed casters, rotating casters, or a combination thereof on a ground facing surface of the bottom wall.

12. The mobile robot of claim 1, wherein the field replaceable battery further comprises a cover on the main body configured to provide access to an internal compartment of the main body comprising the at least one battery cell, the charge sensor, and the circuit.

13. The mobile robot of claim 1, wherein the external power source comprises a wired charging station, a wireless charging station, a direct connection to an AC power source, or a combination thereof.

14. The mobile robot of claim 1, wherein the memory comprises computer program instructions executable by the one or more robot processors to receive the charge state of the at least one battery cell and alter a work task or a navigation path based on the charge state of the at least one battery cell.

15. A mobile robot comprising:
a field replaceable battery comprising:
at least one battery cell contained within a main body,
a charging interface for connecting the at least one battery cell to an external power source,
a blind mate connector electrically connected to the at least one battery cell,
a charge sensor configured to sense a charge state of the at least one battery cell, and
a circuit connected to the charge sensor for receiving a signal indicative of the charge state of the at least one battery cell;
a mobile base comprising a cavity configured to accept the field replaceable battery through an open front side to an engaged position therein, wherein the cavity comprises an open ground facing bottom side and a second blind mate connector position on a wall thereof, wherein the second blind mate connector is configured to engage the blind mate connector of the field replaceable battery when it is in the engaged position within the cavity of the mobile base;
a memory;
one or more robot processors; and
a remote communications interface,
wherein the memory comprises computer program instructions executable by the one or more robot processors to receive the signal from the circuit indicative of the charge state of the at least one battery cell and send data regarding the charge state to a central server via a wireless network.

16. The mobile robot of claim 15, wherein the memory comprises computer program instructions executable by the one or more robot processors to alter a work task or a navigation path of the mobile robot based on the charge state of the at least one battery cell.

17. The mobile robot of claim 15, wherein the central server is configured to send instructions to the one or more robots based on the data regarding the charge state, wherein the instructions are executable by the one or more robot processors to alter a work task or a navigation path of the mobile robot.

18. The mobile robot of claim 15, wherein the cavity of the mobile base comprises opposing inner side walls each having a device connection positioned thereon, wherein the device connections are angled upward from the front end to the back end of the cavity; and
wherein the field replaceable battery comprises a battery connection on each of a first and second side wall of the main body, each of the battery connections angled with respect to a longitudinal axis of the main body, wherein the angle is upward from a front end to a back end of the main body so that engagement with each of the device connections lifts the field replaceable battery into the engaged position that is elevated with respect to a disengaged position and a floor surface on which the mobile base resides.

19. The mobile robot of claim 18, wherein each of the device connections comprise rails and each of the battery connections comprise a set of wheels configured to engage the rails, or wherein each of the battery connections comprise rails and each of the device connections comprise a set of wheels configured to engage the rails.

20. The mobile robot of claim 15, further comprising:
a backup battery configured to provide power to the mobile robot when the field replaceable battery is removed or fully discharged.

\* \* \* \* \*